US012798156B2

(12) United States Patent
Sarda et al.

(10) Patent No.: US 12,798,156 B2
(45) Date of Patent: Nov. 17, 2026

(54) SUSTAINABLE METHODS TO SEPARATE AND RECOVER POLYETHYLENE AND POLYPROPYLENE FROM MIXED PLASTIC WASTE STREAMS

(71) Applicant: The University of Toledo, Toledo, OH (US)

(72) Inventors: Parikshit Sarda, Toledo, OH (US); Balakrishna Maddi, Toledo, OH (US); Joseph G. Lawrence, Toledo, OH (US); Sridhar Viamajala, Toledo, OH (US)

(73) Assignee: The University of Toledo, Toledo, OH (US)

( * ) Notice: Subject to any disclaimer, the term of this patent is extended or adjusted under 35 U.S.C. 154(b) by 506 days.

(21) Appl. No.: 18/290,541

(22) PCT Filed: May 17, 2022

(86) PCT No.: PCT/US2022/029548
§ 371 (c)(1),
(2) Date: Nov. 14, 2023

(87) PCT Pub. No.: WO2022/245764
PCT Pub. Date: Nov. 24, 2022

(65) Prior Publication Data
US 2024/0246263 A1 Jul. 25, 2024

Related U.S. Application Data

(60) Provisional application No. 63/189,264, filed on May 17, 2021.

(51) Int. Cl.
*B29B 17/02* (2006.01)
*B29K 23/00* (2006.01)

(52) U.S. Cl.
CPC ...... *B29B 17/02* (2013.01); *B29B 2017/0203* (2013.01); *B29B 2017/0244* (2013.01); *B29B 2017/0293* (2013.01); *B29K 2023/12* (2013.01)

(58) Field of Classification Search
USPC ........................................................ 521/40.5
See application file for complete search history.

(56) References Cited

U.S. PATENT DOCUMENTS

| | | | |
|---|---|---|---|
| 5,795,923 A | 8/1998 | Shahid | |
| 9,834,621 B2 | 12/2017 | Layman et al. | |
| 9,890,225 B2 | 2/2018 | Layman et al. | |
| 9,982,066 B2 | 5/2018 | Layman | |
| 10,450,436 B2 | 10/2019 | Layman et al. | |
| 10,465,058 B2 | 11/2019 | Layman et al. | |
| 2013/0237620 A1* | 9/2013 | Fan | C08J 11/24 521/46.5 |
| 2017/0002119 A1 | 1/2017 | Layman et al. | |
| 2019/0390031 A1 | 12/2019 | Layman et al. | |
| 2019/0390033 A1 | 12/2019 | Layman et al. | |

FOREIGN PATENT DOCUMENTS

| | | | |
|---|---|---|---|
| DE | 4304726 A1 * | 8/1994 | B03B 5/442 |
| EP | 0491836 | 7/1992 | |
| EP | 0491836 B1 * | 5/1996 | B29B 7/94 |
| JP | H05253434 | 10/1993 | |
| JP | 3183617 B2 | 3/1997 | |
| JP | 6139778 | 5/2017 | |
| TW | 201217440 | 5/2012 | |
| WO | 2012033742 | 3/2012 | |
| WO | 2014173253 | 10/2014 | |

OTHER PUBLICATIONS

DE-4304726-A1 Machine Translation (Year: 1994).*
European Communication pursuant to Article 94(3), dated Nov. 5, 2025, Application No. 22805277.5.
European Communication extended search report, Application No. 22805277.5, dated Mar. 31, 2025.
Poulakis et al., "Recycling of polypropylene by the dissolution/reprecipitation technique: I. A model study", Resources, Conservation and Recycling 20, Elsevier, (1997), pp. 31-41.
PCT International Search Report and Written Opinion, Application No. PCT/US22/29548, dated Sep. 28, 2022.
Achilias et al., "Chemical recycling of plastic wastes made from polyethylene (LDPE and HDPE) and polypropylene (PP)", ScienceDirect, Journal of Hazardous Materials, (2007), vol. 149, pp. 536-542.
Bauer et al., "Sink-float density separation of post-consumer plastics for feedstock recycling", Journal of Material Cycles and Waste Management, (2018), pp. 1-11.
Brandrup et al., "Polymer Handbook Fourth Edition", John Wiley & Sons, Inc, (1998), entire document, especially pp. 692-694, and p. 704.
Gil-Jasso et al., "Dissolution and recovery of waste expanded polystyrene using alternative essential oils", Fuel, (2019), vol. 239, pp. 611-616.
Negami et al., "Dissolution method of unsaturated polyester in bean oil", ScienceDirect, (2003), vol. 24, Issue 2, pp. 221-225.

* cited by examiner

*Primary Examiner* — Terressa Boykin
(74) *Attorney, Agent, or Firm* — MacMillan, Sobanski & Todd, LLC

(57) ABSTRACT

Sustainable methods to separate and recover polypropylene (PP) and polyethylene (PE) from mixed plastic wastes are described. The methods utilize a class of green solvents, namely, oils, which can selectively dissolve PP, but not PE or other polymers. When re-precipitated, the recovered PP has properties similar to virgin PP.

20 Claims, 40 Drawing Sheets
(39 of 40 Drawing Sheet(s) Filed in Color)

SUSTAINABLE METHODS TO SEPARATE AND RECOVER POLYETHYLENE AND POLYPROPYLENE FROM MIXED PLASTIC WASTE STREAMS

RELATED APPLICATIONS

This is the national phase entry of international application PCT/US2022/029548, filed under the authority of the Patent Cooperation Treaty on May 17, 2022, published; which claims priority to U.S. Provisional Application No. 63/189,264 filed under 35 U.S.C. § 111 (b) on May 17, 2021. The entire disclosure of each of the aforementioned applications is incorporated herein by reference for all purposes.

STATEMENT REGARDING FEDERALLY SPONSORED RESEARCH

This invention was made with no government support. The government has no rights in this invention.

BACKGROUND

More than 90% of plastics produced in US are either landfilled or incinerated which results in land/water pollution and increases in greenhouse gas emissions. Due to the easily visible plastic contamination of water bodies, there is growing public concern over damage to aquatic life and ecosystems as well as potential risks to human health. Many (if not most) challenges associated with plastics pollution can be abated through cost- and energy-efficient recovery and recycling (i.e., circular lifecycle) or by converting plastics to high(er)-value products (i.e., upcycling). As a result of growing public concern around plastic waste and growing consumer acceptance and even preference for recycled plastics, the market potential for plastics recycling has become significant and is expected to continue growing. According to one market research report, the global market for plastic recycling is estimated to be $36.4 billion in 2022, and is projected to increase at a rate of 6.1% and reach $47.3 billion by 2026.

There are many possible pathways to recycle plastics—(i) mechanical recycling, (ii) chemical recycling including chemolysis and thermo-chemical conversions (e.g., pyrolysis, catalytic pyrolysis, and gasification), and (iii) recycling via selective dissolution. Mechanical recycling is the most straightforward approach that uses physical methods such as crushing, remolding, or melting, and is generally preceded by sorting operations for separating individual polymers from plastic mixtures. Mechanical recycling preserves the chemical structure of polymers, but diminishes plastic properties (such as mechanical strength) such that the recycled products are lower quality and lower value than the parent polymers. Chemical recycling involves depolymerization of plastics. Chemolysis—a process that is specifically applicable to condensation polymers such as polyethylene terephthalate (PET) and polyamides—breaks polymers to constitutive monomers. Thermochemical conversion methods disintegrate polymers to more fundamental hydrocarbon building blocks. In addition to the limited feedstocks that can be recycled via chemolysis, careful upstream sorting and cleaning is important for this method to prevent later downstream challenges in recovery of high purity monomers that are essential for polymer resynthesis. Operating costs, including catalyst use and energy intense monomer purification costs, can also be prohibitively high for chemolysis. Thermochemical conversion is feedstock agnostic and can be applied to mixed plastics; however, products are crude oil-like hydrocarbon mixtures that need to be almost re-refined and processed to reproduce polymers. High temperature operations are also of concern for thermochemical methods. Dissolution-based methods do not alter the chemical structure of polymer(s) and instead use solubility properties of polymer(s) in solvent(s) as a way of selective separation. Later, the polymer(s) can be recovered by removal of the solvent (e.g., via evaporation) or by addition of an anti-solvent. Evaporation of solvent generally involves heating the polymer-solvent solution which leads to exposure of the polymer chains to high temperature for long periods and may lead to polymer disintegration. Alternately, low boiling solvents (such as propane) could be used but would require high pressure dissolution operations in addition to causing concerns about fugitive solvent emissions. The challenges with using evaporation methods for polymer recovery could be avoided by using a high boiling solvent (to prevent high pressure operations and potential solvent emissions) in combination with an appropriate anti-solvent (to avoid high temperature solvent evaporation).

Although the dissolution-based methods are more desirable than mechanical or chemical recycling to recover virgin-like polymers at low cost and environmental footprint, several challenges exist. The first challenge is in determining an appropriate solvent that has high selectivity for a specific polymer. This problem is exacerbated for mixed plastics and multi-layer plastics, which are the plastic waste categories of most significant environmental concern. The second challenge is to discover/develop high-specificity solvents that are also safe, non-toxic, environmentally benign, and renewable. This set of criteria is important to ensure that the recycling process intended to mitigate environmental concerns does not pose fresh or additional pollution and sustainability challenges. A third challenge is finding an anti-solvent that is compatible with the solvent. Finally, a fourth challenge is to find solvent/anti-solvent combinations that allow recovery of pure polymer from other additives such as fillers and pigments. Thus, there remain challenges in the art which must be overcome.

Among the many plastics currently in use, polypropylene (PP) is one of the most common. PP is a thermoplastic polymer and widely used as packaging material, automotive components, medical devices, and laboratory equipment. PP represents approx. 20% of all plastics currently produced worldwide. PP use continues to grow—global PP production in the year 2030 is expected to reach approx. 83 million tons from current production levels of approx. 70 million tons. In spite of its great production and use, PP is one of the most poorly recycled polymers; only 1% of PP produced globally is recycled. The remainder is discarded and ends up in either landfills or as litter on land and in water bodies. Besides environmental concerns, customer preference and demand for recycled PP is also growing. According to the Association of Plastics Recyclers (APR), there is currently a large demand for recycled PP in North America. APR estimates that the current market for recycled PP is approx. 450 kilotons per year and is worth $0.77 billion.

Polyethylene (PE) is the other polyolefin that is widely used and accounts for nearly 30% of all plastics produced worldwide. The two common types of PE are high density polyethylene (HDPE) and low density polyethylene (LDPE). HDPE is used in high mechanical strength applications such as bottles and LDPE is most used as films. HDPE has a relatively high recycle rate (nearly 30%) owing to the relative ease of collecting and sorting HDPE containers. LDPE recycling rates are poor at approx. 4%.

Considering the above, there is a need in the art for new and improved methods of recycling and recovering PP and PE.

SUMMARY

Provided is a method of separating PP from mixed plastic waste, the method comprising adding plastics, plastic formulations, plastic composites, multilayer packaging (MLP), or mixed plastics to an oil maintained at a temperature ranging from about 180 °C to about 230 °C for a time sufficient to dissolve PP from the plastic feed in the oil, thereby forming an oil-PP solution; separating the oil-PP solution from the mixed plastic waste using a solid-liquid separation technique; and allowing the oil-PP solution to cool to a lower temperature, thereby forming an oil-PP mixture, to recover the PP. When the PP concentrations in oil are less than about 2 wt %, the cooling results in formation of a distinct solid phase of oil-infused PP, different from the liquid oil phase. When the PP concentrations in the oil are more than about 2 wt %, a distinct oil-PP phase separation does not occur after cooling. Instead, the cooling produces a homogeneous gel-like or wax-like solid phase containing oil and PP. In either case (low or high solids concentrations), addition of an anti-solvent causes removal of the infused oil and results in recovery of pure PP.

In certain embodiments, the temperature is about 200 °C. In certain embodiments, the lower temperature is about room temperature. In certain embodiments, the mixed plastic waste comprises PE. In certain embodiments, the time is from about 2 minutes to about 60 minutes. In certain embodiments, the time is about 15 minutes.

In certain embodiments, the recovered PP has a Young's Modulus, melt flow index, degradation temperature, and melting point comparable to pristine PP.

In certain embodiments, the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof.

In certain embodiments, the method comprises adding an anti-solvent to the oil-PP mixture to aid the re-precipitation of the PP and facilitate removal of oil. In particular embodiments, the method further comprises separating the re-precipitated PP from the oil and anti-solvent. In particular embodiments, the method further comprises separating the oil from the anti-solvent. In particular embodiments, the anti-solvent is hexane, ethanol, propanol, butanol, isopropyl alcohol, other linear or branched alcohols, or other organics with a high affinity for oil, or a mixture thereof. In particular embodiments, the anti-solvent is incubated with the oil-PP mixture at a second temperature ranging from room temperature to about 70 °C for a time of from 2 min to 2 h. In particular embodiments, multiple anti-solvent washes are implemented to facilitate removal of trace oil from the re-precipitated PP.

In certain embodiments, the oil-infused PP is a product with properties that may be useful in some applications such as in low slip surfaces.

In certain embodiments, the mixed plastic waste is a polyolefin mixture containing PE and PP. In certain embodiments, the mixed plastic waste is obtained by separating polyolefins from mixed plastics using a sink-floatation method to recover the polyolefin mixture. In particular embodiments, the solid-liquid separation technique is a gravity separation.

Further provided is a method of separating PP from mixed plastic waste, the method comprising adding mixed plastic waste to an oil maintained at a temperature ranging from about 180 °C to about 230 °C for a time sufficient to dissolve PP from the mixed plastic waste in the oil; separating the oil containing the dissolved PP from the mixed plastic waste using a solid-liquid separation technique; allowing the oil containing the dissolved PP to cool to a lower temperature, thereby forming an oil-PP mixture; adding an anti-solvent to the cooled oil-PP mixture to facilitate re-precipitation of PP and facilitate removal of oil infused within the re-precipitated PP; separating the re-precipitated PP from the oil-anti-solvent mixture; and separating the oil and anti-solvent from each other to allow their reuse.

In certain embodiments, the lower temperature is about room temperature.

In certain embodiments, the mixed plastic waste comprises PET, PE, PP, polyvinyl chloride (PVC), polystyrene, and nylon.

In certain embodiments, the time is about 15 minutes.

In certain embodiments, the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof.

In certain embodiments, the anti-solvent is hexane, ethanol, propanol, butanol, isopropyl alcohol, other linear or branched alcohols, or other organics with a high affinity for oil, or a mixture thereof.

In certain embodiments, the anti-solvent is incubated with oil-infused PP at a temperature ranging from room temperature to about 70 °C for a time of from 2 min to 2 h.

In certain embodiments, multiple anti-solvent washes are implemented to facilitate removal of trace oil from the re-precipitated PP.

In certain embodiments, the solid-liquid separation technique comprises a gravity separation or filtration.

Further provided is a method for recovering PP and PE separately from mixed plastic wastes, the method comprising separating polyolefins from the mixed plastic wastes using a sink-floatation method to recover a polyolefin mixture containing PE and PP; incubating the polyolefin mixture in an oil maintained at a temperature ranging from about 180 °C to about 230 °C for a time sufficient to dissolve the PP in the oil; separating the oil containing the dissolved PP from the polyolefin mixture by gravity separation or filtration; allowing the oil containing the dissolved PP to cool to a lower temperature, thereby forming an oil-PP mixture; adding an anti-solvent to the cooled oil-PP mixture to re-precipitate PP; separating the re-precipitated PP from the oil-anti-solvent mixture; and separating the oil and anti-solvent from each other to allow their reuse.

In certain embodiments, the time is about 15 minutes. In certain embodiments, the temperature is about 200 °C. In certain embodiments, the lower temperature is about room temperature. In certain embodiments, the mixed plastic waste comprises PET, PE, PP, PVC, polystyrene, and nylon.

In certain embodiments, the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof.

In certain embodiments, the anti-solvent is hexane, ethanol, propanol, butanol, isopropyl alcohol, other linear or branched alcohols, or other organics with a high affinity for oil, or a mixture thereof. In particular embodiments, the anti-solvent is incubated with the re-precipitated and oil-infused PP at a second temperature ranging from room temperature to about 70 °C for a time of from 2 min to 2 h. In particular embodiments, multiple anti-solvent washes are implemented to facilitate removal of trace oil from the re-precipitated PP.

In certain embodiments, the oil-infused PP is a product with properties that may be useful in various applications such as in low slip surfaces.

In certain embodiments, the method comprises adding the anti-solvent to the oil-infused but undissolved PE to facilitate removal of oil infused within the PE. In particular embodiments, the method further comprises separating the PE from the oil and anti-solvent. In particular embodiments, the method further comprises separating the oil from the anti-solvent. In particular embodiments, the anti-solvent is hexane, ethanol, propanol, butanol, isopropyl alcohol, other linear or branched alcohols, or other organics with a high affinity for oil, or a mixture thereof. In particular embodiments, the anti-solvent is incubated with the oil-infused PE at a second temperature ranging from room temperature to about 70 °C for a time of from 2 min to 2 h. In particular embodiments, multiple anti-solvent washes are implemented to facilitate removal of trace oil from the re-precipitated PE.

In certain embodiments, the oil-infused PE is a product with properties that may be useful in various applications such as in low slip surfaces.

In certain embodiments, the recovered PE has a Young's Modulus, melt flow index, degradation temperature, and melting point comparable to pristine PE.

In certain embodiments, the dissolution of PP in oil allows the removal/release of fillers and hydrophobic pigments from the PP matrix. The pigments remain dissolved in the oil or anti-solvent during the rest of the process such that the re-precipitated PP is substantially pigment-free. The fillers get released into the oil as particulates and can be separated from hot oil, while the PP is still dissolved, by filtering or settling the particulates.

In certain embodiments, the infusion of oil into PE allows the removal/release of fillers and hydrophobic pigments from the PE matrix. The pigments remain dissolved in the oil or anti-solvent during the rest of the process such that the re-precipitated PP is substantially pigment-free. The fillers get released into the oil as particulates and can be separated from hot oil, while the PP is still dissolved, by using coarse filters to separate the PE followed by fine filters to recover the particulates. If the fillers have a higher specific gravity than PE, the filler particulates can be recovered by differential gravity separation.

In certain embodiments, the fillers free from the plastic matrix can be recovered at the end of the process after anti-solvent washes are completed. The particulate fillers released from the plastic matrix during the solvent and anti-solvent steps become loosely associated with plastic surfaces because of the dissolution and oil infusion rather than being embedded within the plastic matrix. The loosely associated filler particulates can be water washed off the surface of the recovered/re-precipitated plastics.

Further provided is a pretreatment method for removing hydrophilic pigments, adhesives, and food residues stuck to waste plastic, the method comprising incubating a plastics mixture in an acid solution at an elevated temperature for a first time sufficient to dissolve the pigments and adhesives, and dislodge/hydrolyze food residues adhered to the plastic surfaces while keeping polymer structures intact in the plastics mixture. The clean plastics can then be used as feed to the rest of the process to selectively dissolve PP from mixed plastics. In certain embodiments, the pretreatment temperature is about 90 °C. In certain embodiments, the first time is about 90 minutes. In certain embodiments, the plastics mixture comprises PET, PE, PP, PVC, polystyrene, and nylon. In certain embodiments, the acid is a mineral acid, an organic acid, or a combination thereof.

Further provided is the use of an oil at a temperature ranging from about 180 °C to about 230 °C to dissolve PP from a mixture of plastics and thereby separate the PP from the mixture of plastics. In certain embodiments, the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof.

Further provided is a recycled material comprising PP and an oil in an amount of less than 2% by weight, wherein the oil is attached to surfaces or void spaces of the PP. In certain embodiments, the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof. Further provided is the use of an anti-solvent to remove the oil attached to the surfaces or void spaces of the PP of the recycled material, to produce a substantially oil-free PP.

Further provided is a recycled material comprising PE and an oil in an amount of less than 2% by weight, where the oil is attached to surfaces or void spaces of the PE. In certain embodiments, the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof. Further provided is the use of an anti-solvent to remove the oil attached to the surfaces or void spaces of the PE of the recycled material, to produce a substantially oil-free PE.

Further provided is a method of recycling PP from a mixed plastic material, the method comprising incubating the mixed plastic material in an oil at a temperature ranging from about 180 °C to about 230 °C for a period of time sufficient to cause PP to selectively dissolve from the mixed plastic material into the oil; separating the oil from the mixed plastic material; allowing the oil containing the dissolved PP to cool to a lower temperature sufficient to cause re-precipitation of the PP; and separating the re-precipitated PP from the oil to recycle the PP. In certain embodiments, the period of time ranges from about 5 minutes to about 30 minutes. In certain embodiments, the lower temperature is about room temperature.

Further provided is a method for recycling and reusing oil used for dissolution of PP, the method comprising adding an anti-solvent to oil containing dissolved PP to re-precipitate PP; and separating the re-precipitated PP from the oil leaving behind oil-anti solvent mixture. In certain embodiments, the method further comprises separating the oil and anti-solvent by distillation or a similar separation method based on a difference in boiling point. The separated oil and anti-solvent can be used for further dissolving PP and causing PP re-precipitation, respectively. In particular embodiments, the distillation temperature is about 50 °C. In particular embodiments, the distillation pressure is about 335 mbar.

In certain embodiments, the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof.

In certain embodiments, the anti-solvent comprises non-polar organic solvents comprising hexane, pentane, heptane, benzene, toluene, xylene, or a combination thereof.

In certain embodiments, the anti-solvent comprises polar solvents comprising methanol, ethanol, propanol, isopropanol, butanol, other alcohols, or a mixture thereof.

Further provided is a method of dissolving PP in hot oil at concentrations between about 1% and 50% (g PP/g oil). In certain embodiments, the PP completely dissolves in oil even at the high concentrations of 50%. In certain embodiments, the viscosity of the oil-PP solution does not appreciably increase when the concentration of PP is below 20%. In certain embodiments, the PP can be recovered from the oil after cooling and addition of anti-solvent, irrespective of the concentration of dissolved PP. In certain embodiments, the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
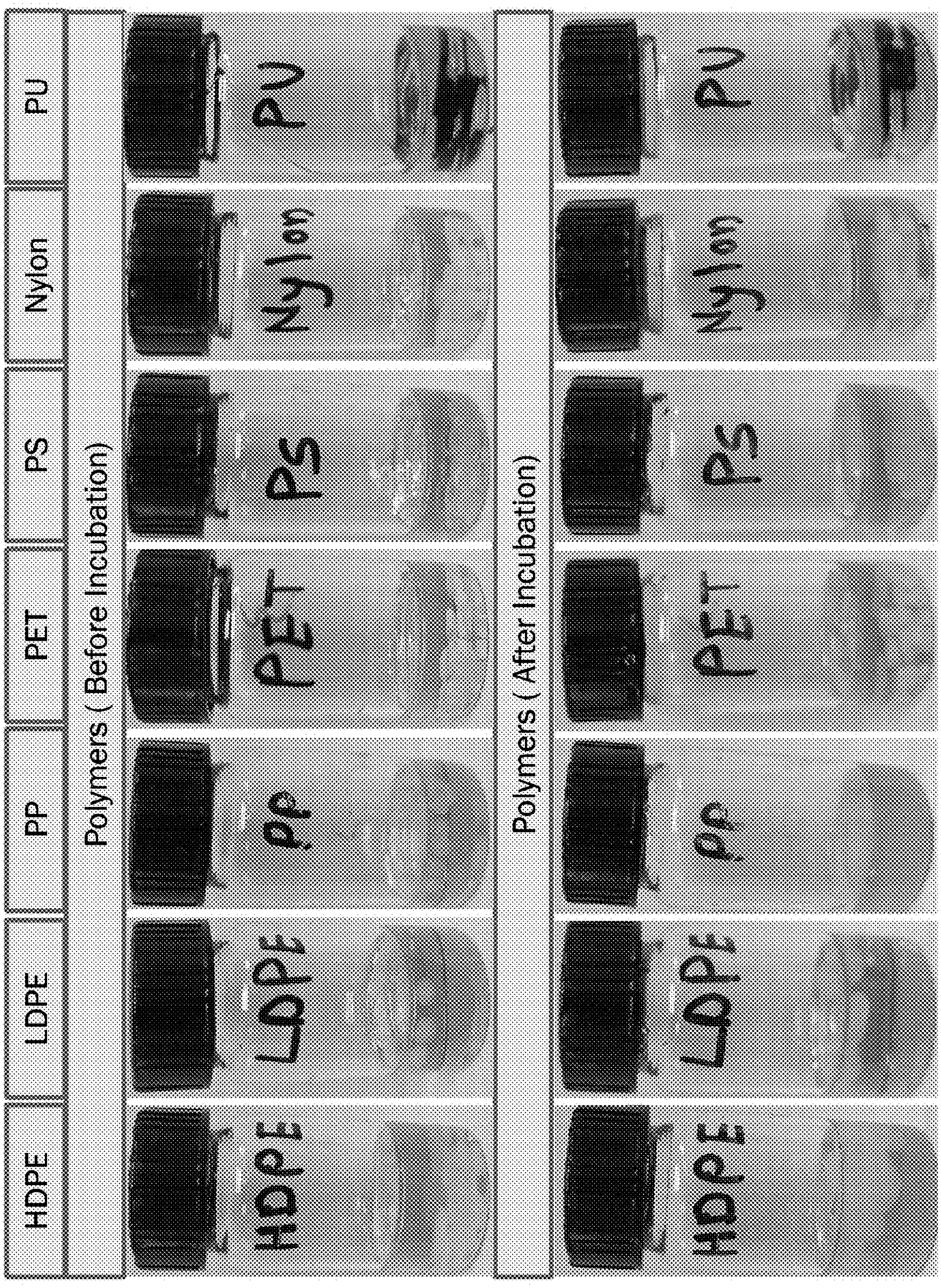
FIG. 1A: Photographs showing solubility test of plastics in waste cooking oil. Only PP was soluble.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Provided herein are dissolution and re-precipitation processes which utilize waste resources and green solvents to separately recover and upcycle PP and PE from mixed plastic waste streams. The methods may produce virgin-like high quality recycled PP and PE from zero-value feedstocks, and may produce recycled PET without PP contamination. The methods may also be used to produce oil-infused PP and PE that may be used as high value low slip plastic material.

In accordance with the present disclosure, highly selective dissolution of PP in certain green solvents has been discovered. The solvents are widely available, inexpensive, non-toxic, and biodegradable. Further, the solvents have high boiling points so that fugitive losses during processing can be prevented. The solvents are also compatible with several "generally regarded as safe (GRAS)" anti-solvents, of which several have low boiling points that would allow favorable energy use during recovery of solvent and anti-solvent from their mixtures. It is demonstrated in the examples herein that the solvent selectively dissolves PP from mixed plastics waste as well as from MLP. In addition, it is demonstrated herein that fillers and pigments can be largely removed (and in some cases, recovered) from PP. The recovered PP is shown to have high purity and virgin-like properties even when challenging mixed plastic, multilayer, and pigmented/filled materials were used as feed.

An additional use of the methods herein is in the recovery of PE. Of the plastics that are currently in use, PP and PE (together referred to as polyolefins) have lower densities than water (except for plastic foams). All other major plastics— PET, polystyrene, polyamides, and PVC—have a higher density than water. This property difference allows easy separation of mixtures of PP and PE from other plastics via flotation in water—a prevalent plastics recycling industry practice called "sink and float separation". However, conventionally, there has been a problem separating PP and PE from polyolefin mixtures because the densities of PP and PE are very similar (0.94-0.96 g/cm$^3$). Since conventional processes do not separate PE and PP, the recycling potential of these plastics is severely restricted. When widely available "floats", primarily containing PE and PP, are used as feed in the methods described herein, the selective dissolution of PP also generates a purified PE residue from the binary mixtures.

In accordance with the present disclosure, vegetable/plant oils and waste oils/fats (especially yellow grease, brown grease, animal fats, and the like), either individually or in a mixture as solvent, can be used to selectively recover, recycle, and/or upcycle PP and/or PE from mixed plastic wastes. Vegetable/plant oils and waste oils/fats are considered "green solvents" because of low toxicity, low volatility, availability from renewable sources, biodegradability, non-corrosiveness, and low carbon footprint. The methods herein may be described as including dissolution/re-precipitation of PP in vegetable/plant oils and waste oil/fats.

The methods herein are sustainable methods to exclusively recover PP from mixed plastic wastes, MLP wastes, and post-consumer wastes. In accordance with the present disclosure, it has been observed that PP dissolves in oils in the temperature range of 180-230 °C while other polymers (such as PE, PET. PVC, polystyrene, and nylon) do not dissolve in oils at these temperatures. This observed phenomenon allows for the design of methods to separately recover PP from mixed plastic wastes and MLP wastes.

In general, the method involves adding an oil, such as a cooking oil (e.g., a vegetable oil) to a mixture of plastics, and incubating the mixture at a temperature ranging from about 180 °C to about 230 °C for a time ranging from about 5 minutes to about 1 hour, so as to cause dissolution of the PP in the oil. In some non-limiting examples, the temperature is about 200 °C and the time is about 15 minutes. However, many other temperatures within the range of from about 180 °C to about 230 °C, and other incubation times, are possible and encompassed within the scope of the present application. Any triglyceride-containing oil, such as, but not limited to, yellow grease, cooking oil, brown grease, non-edible oil, and vegetable oils can be used in the methods described herein. Non-limiting examples of suitable oils include soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, algae oil, and combinations thereof. Advantageously, the oil is a green solvent.

The oil-PP solution can be separated from the remaining plastic wastes through any conventional solid-liquids separation technique, such as, but not limited to, filtration, evaporation, or distillation. The oil-PP solution can then be allowed to cool to room temperature. The cooled oil-PP solution is referred to herein as an oil-PP mixture. When the PP concentrations in oil are less than about 2 wt %, the cooling results in formation of a distinct solid phase of oil infused PP, different from the liquid oil phase. When the PP concentrations in the oil are more than about 2 wt %, a distinct oil-PP phase separation does not occur after cooling. Instead, the cooling produces a homogeneous gel-like or wax-like solid phase containing oil and PP. In either case (low or high solids concentrations), addition of an anti-solvent causes removal of the infused oil and results in the recovery of PP. Suitable anti-solvents include, but are not limited to, hexane, ethanol, propanol, butanol, isopropyl alcohol, other linear or branched alcohols, or other organics with a high affinity for oil, or a mixture thereof. The re-precipitated PP, a solid, is easily separated from the oil (and optional anti-solvent) through any conventional solid-liquid separation technique, thereby separating PP from the mixture of plastics. When an anti-solvent is used, the anti-solvent and oil can then be separated from each other, and can be re-used in the process if desired.

Figure 1B:
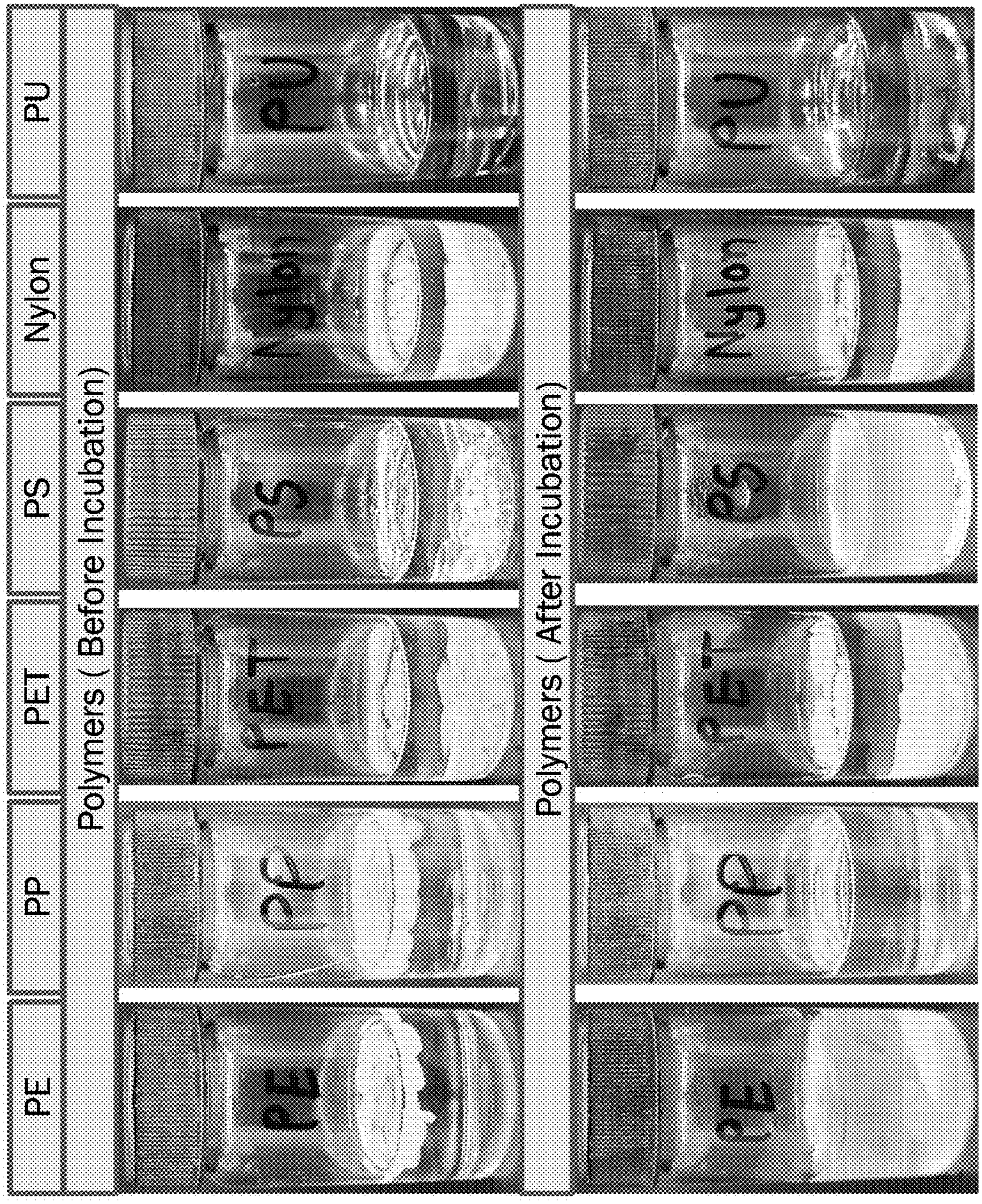
FIG. 1B: Photographs showing solubility test of plastics in coconut oil. Only PP was soluble.
Figure 1C:
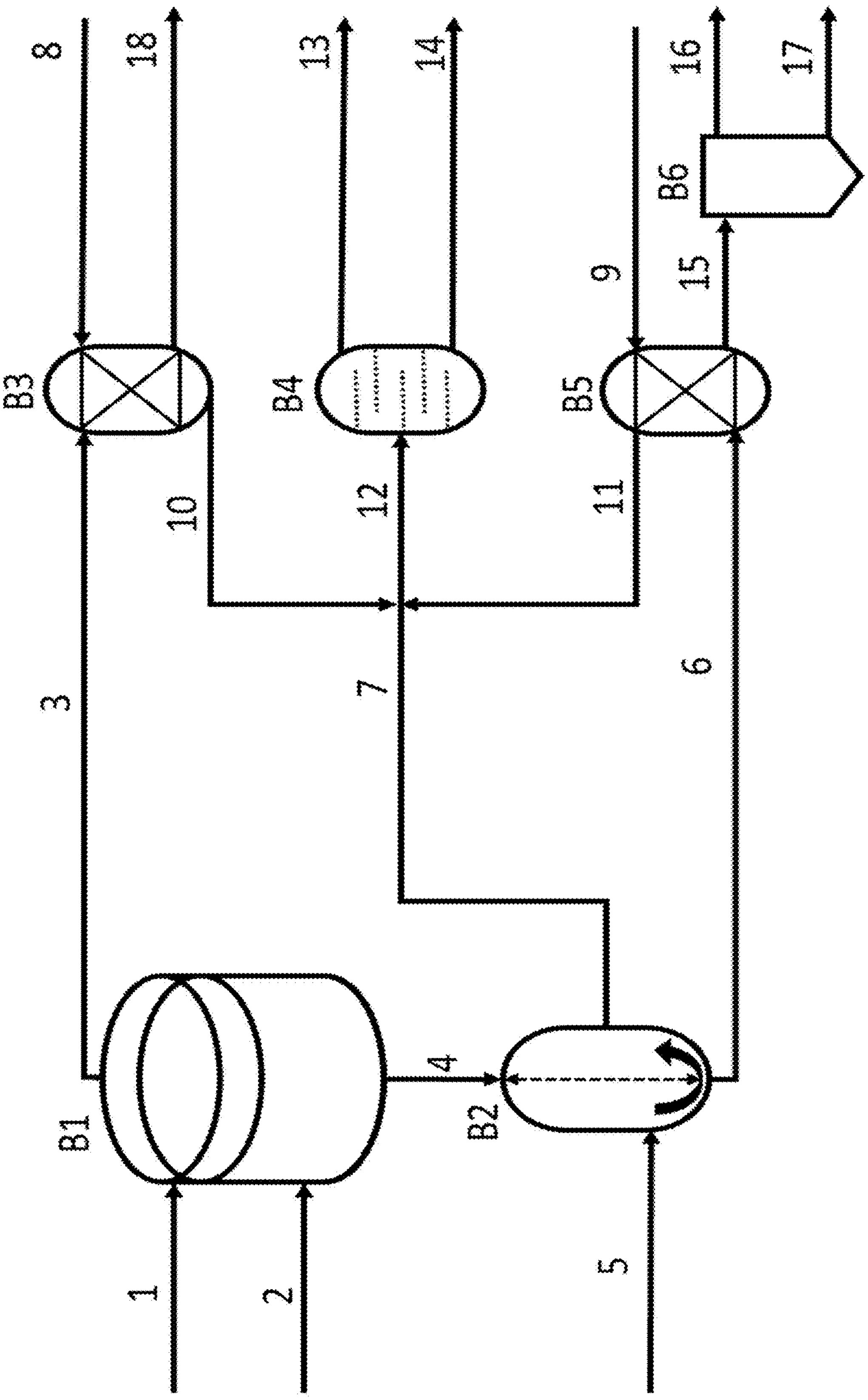
FIG. 1C: Generic flow diagram illustrating a non-limiting example system for a process to recover PP and PE from mixed plastic waste.

Referring now to FIG. 1C, depicted is a block diagram of a non-limiting example system for employing a method for separating and purifying PP and PE from mixed plastics waste. The following Table 1 displays the function of the equipment depicted and numbered B1-B6 in the system in FIG. 1C.

TABLE 1

Equipment summary for the example system depicted in FIG. 1C for the recovery of PP and PE from mixed plastic waste

| Equipment | Function |
|---|---|
| B1 | Separator |
| B2 | Re-precipitator and Centrifuge |
| B3 | PE Purification |
| B4 | Solvent-Anti-solvent Separator |
| B5 | PP Purification |
| B6 | Additives Remover |

Referring to FIG. 1C, plastic waste streams 1, which is a polyolefin mixture obtained from a sink & float method, and 2, which is a green solvent (oil) stream, may be added to a separator B1, in which the plastic waste streams 1, 2 are incubated in an oil maintained at a temperature ranging from about 180 °C to about 230 °C so as to selectively dissolve PP. The PP dissolves in oil and is separated, such as through gravity filtration, and delivered to the re-precipitator and centrifuge B2 where an anti-solvent stream 5 is added to aid the precipitation of PP. The non-dissolved plastic waste stream 3 from the separator B1 is delivered to a PE purification apparatus B3. In B3, undissolved PE from B1 is treated with an anti-solvent stream 8 to remove any infused oil from PE so as to produce purified PE (stream 18) and a stream 10 of leftover mixture of oil and anti-solvent. In the re-precipitator and centrifuge B2, the oil-PP mixture in stream 4 is re-precipitated out of the oil with the use of an anti-solvent (stream 5) to produce re-precipitated PP (stream 6) and a mixture of oil and anti-solvent in stream 7. The re-precipitated PP in stream 6 is delivered to a PP purification apparatus B5 for purification to produce a further purified PP stream 15, for example by contacting the re-precipitated PP stream 6 with a second anti-solvent stream 9 at an elevated temperature and pressure. The streams 7, 10, 11 of leftover mixture of oil and anti-solvent are combined in stream 12 and delivered to the solvent-anti-solvent separator B4 which separates the anti-solvent 13 from the oil 14. The anti-solvent 13 and oil 14 can then be re-used in the process if desired. The purified PP 15 is subjected to one or more processes to remove additives (for example, a water wash to remove additives released from the PP matrix during dissolution) in the additives remover B6, which produces pure PP 16 and removed additives 17.

The methods herein are sustainable, energy-efficient, and capable of recovering virgin-like quality PP and PE from mixed plastic wastes and MLP waste. These methods also have the capability to remove PP contamination in PET recycled streams from existing plastic recycling facility. Furthermore, advantageously, oil-infused PP and PE may be used for high-value applications (upcycling), such as ultra-high strength fibers and films, and no-slip plastics (low-coefficient of friction). The recovered PP may have residual oil (less than 2% by weight) attached to surfaces or void spaces of the polymer.

EXAMPLES

In these examples, by integrating with the conventional sink-floatation method (which involves separation based on density) or without, the separation of PP or PE from mixed plastic wastes is demonstrated. When integrated with the sink-float method, greater than 98% of PP and PE present in the mixed wastes was separately recovered. This is significant because the conventional sink-floatation method, widely used in industry, produces a polyolefin mixture of PP and PE that cannot be further separated by known conventional methods.

Example 1

Figure 2A:
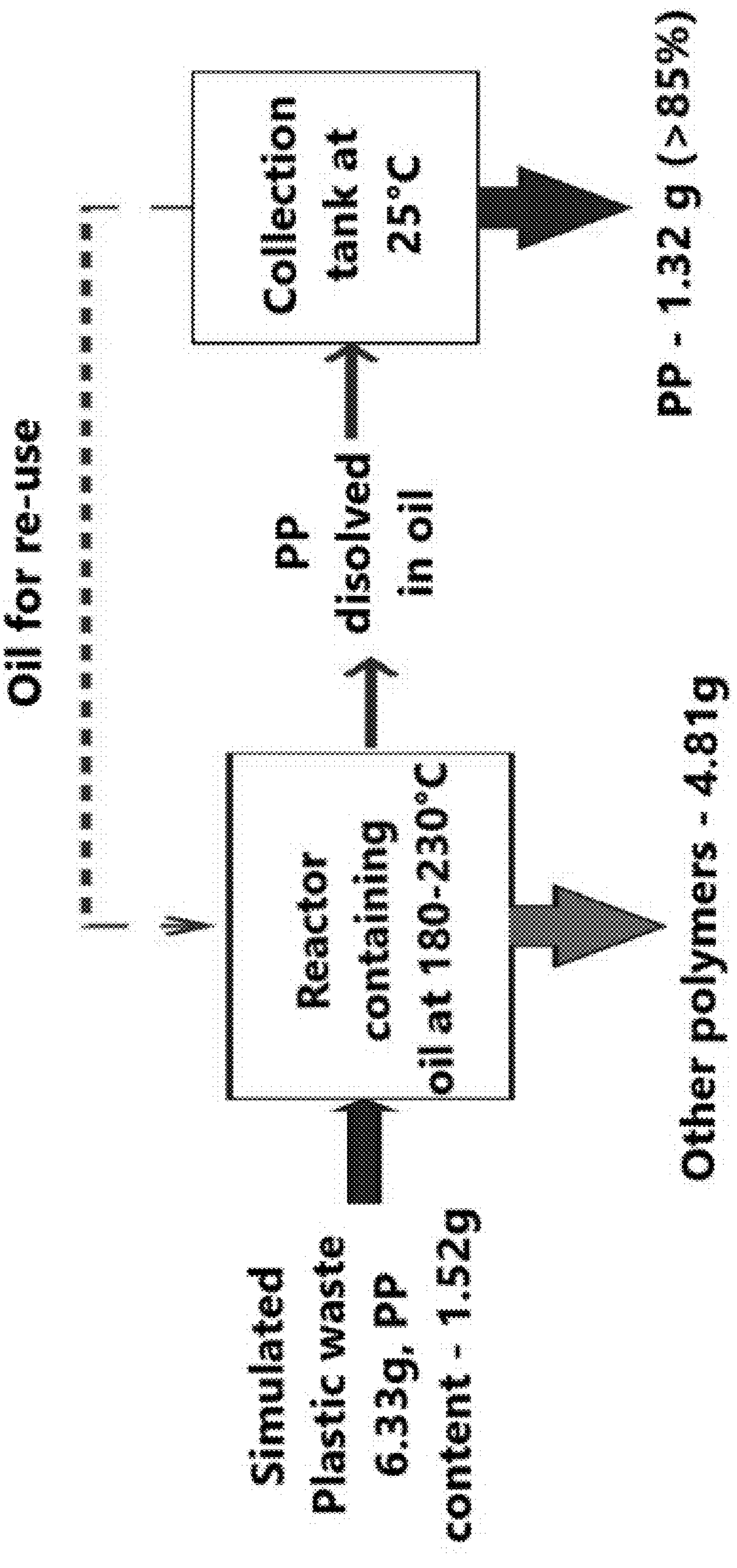
FIG. 2A: Total and component-mass balance data obtained from lab-scale experiments to separate and recover PP from mixed plastic waste using triglycerides (here waste cooking oil) through a dissolution/re-precipitation method.
Figure 2B:
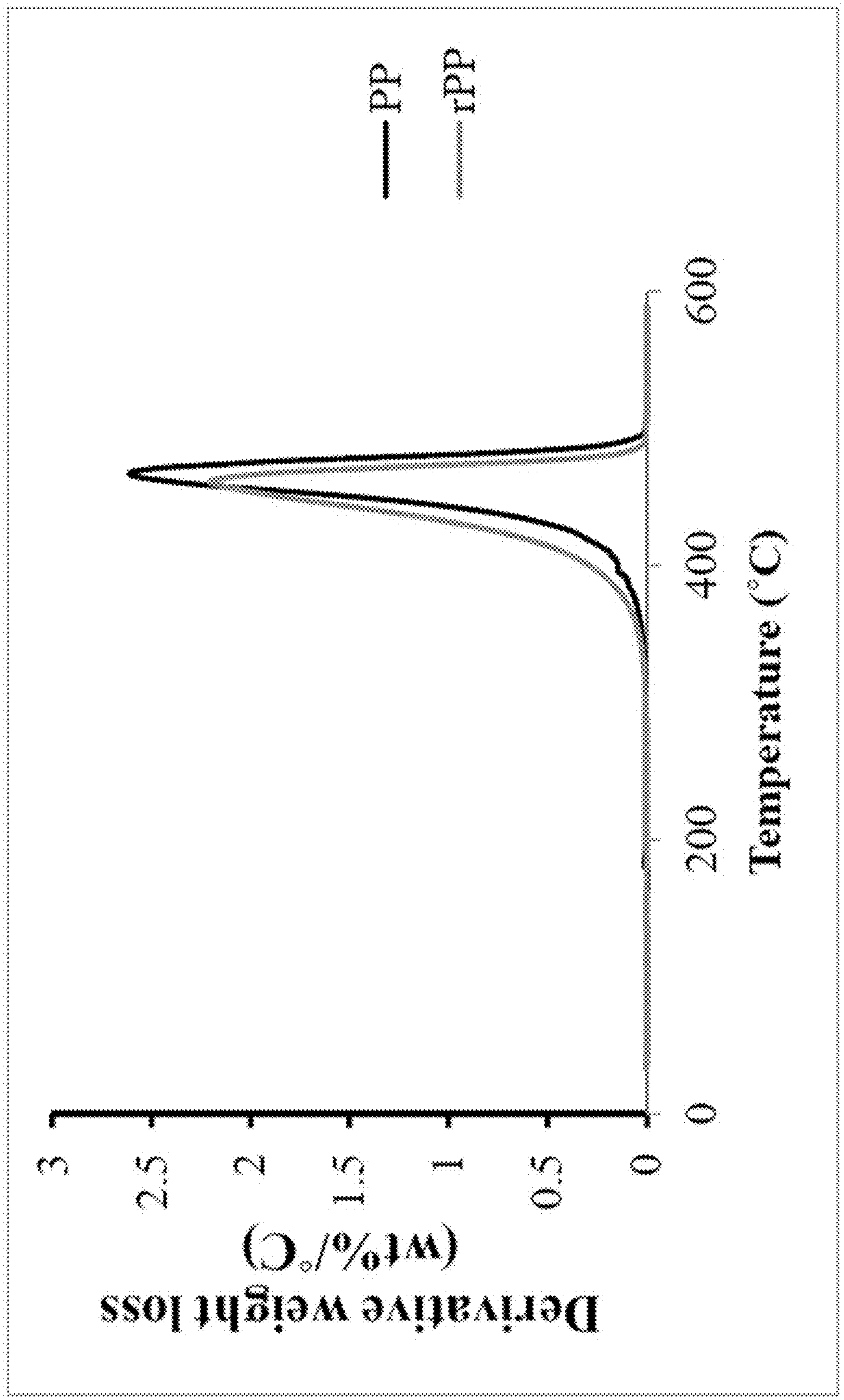
FIG. 2B: Thermal degradation profiles of pristine PP and recovered PP (rPP) produced from the dissolution/re-precipitation method described herein.
Figure 2C:
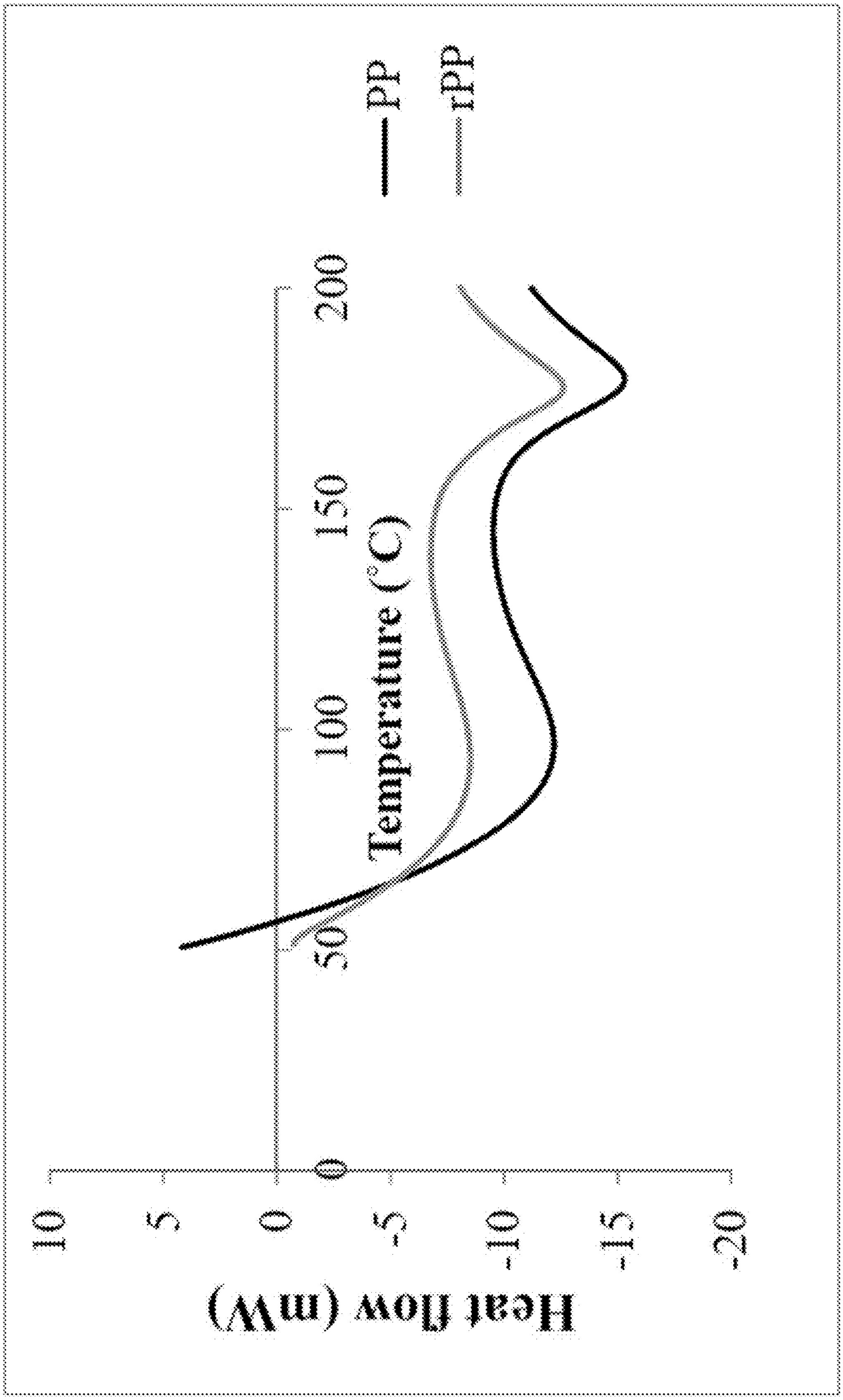
FIG. 2C: DSC profiles of pristine PP and recovered PP (rPP) produced from the dissolution/re-precipitation method described herein.
Figure 2D:
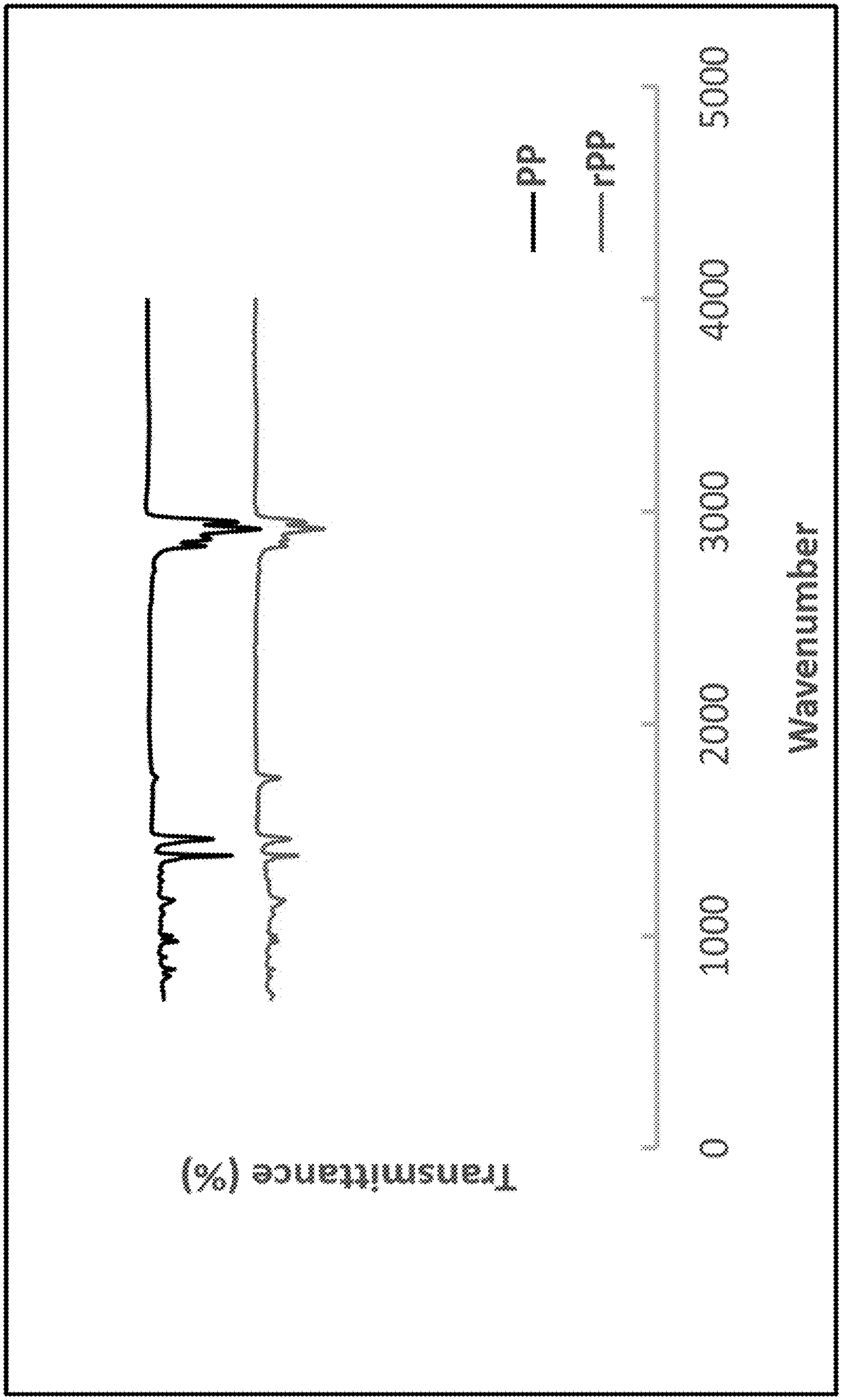
FIG. 2D: FTIR profiles of pristine PP and recovered PP (rPP) produced from the dissolution/re-precipitation method described herein.

Individual plastics— PE, PP, PET, polystyrene (PS), nylon, and polyurethane (PU) were incubated in hot waste cooking oil (FIG. 1A) and hot coconut oil (FIG. 1B) (200 °C for 15 min). Only PP dissolved under both conditions while the other plastics remained insoluble. In a follow up experiment, mixed plastic waste containing PET, PE, PP, PVC, and nylon was added to waste cooking oil (WCO) maintained at 200 °C. Only PP dissolved in the waste cooking oil at this temperature, which facilitates easy separation of PP from plastic mixtures using conventional solid-liquid operation. Upon cooling the oil-PP solution to room temperature and addition of anti-solvent, PP re-precipitated, which was then separated from the oil. The mass balance of this process is shown in FIG. 2A, which demonstrates separate recovery of >87% of PP present in the mixed plastic waste. Filaments made from recycled PP have similar Young's Modulus (891±51 MPa) when compared to pristine PP material (785±54 MPa). Also, the thermal properties (degradation temperature and melting point) of recycled PP from the dissolution/re-precipitation method were similar to virgin PP (see FIGS. 2B, 2C). Melt flow index of recycled PP (9.27 g/10 min) measured as per ASTM D1238 standard procedures, were comparable to that of pristine PP (11.48 g/10 min). Also, the molecular fingerprint (FTIR spectrum) of recycled PP from the dissolution/re-precipitation method were similar to virgin PP (see FIG. 2D). Therefore, the dissolution/re-precipitation technique using green solvents produces "virgin-like" quality of recycled PP from mixed plastic wastes.

Example 2

Figure 3A:
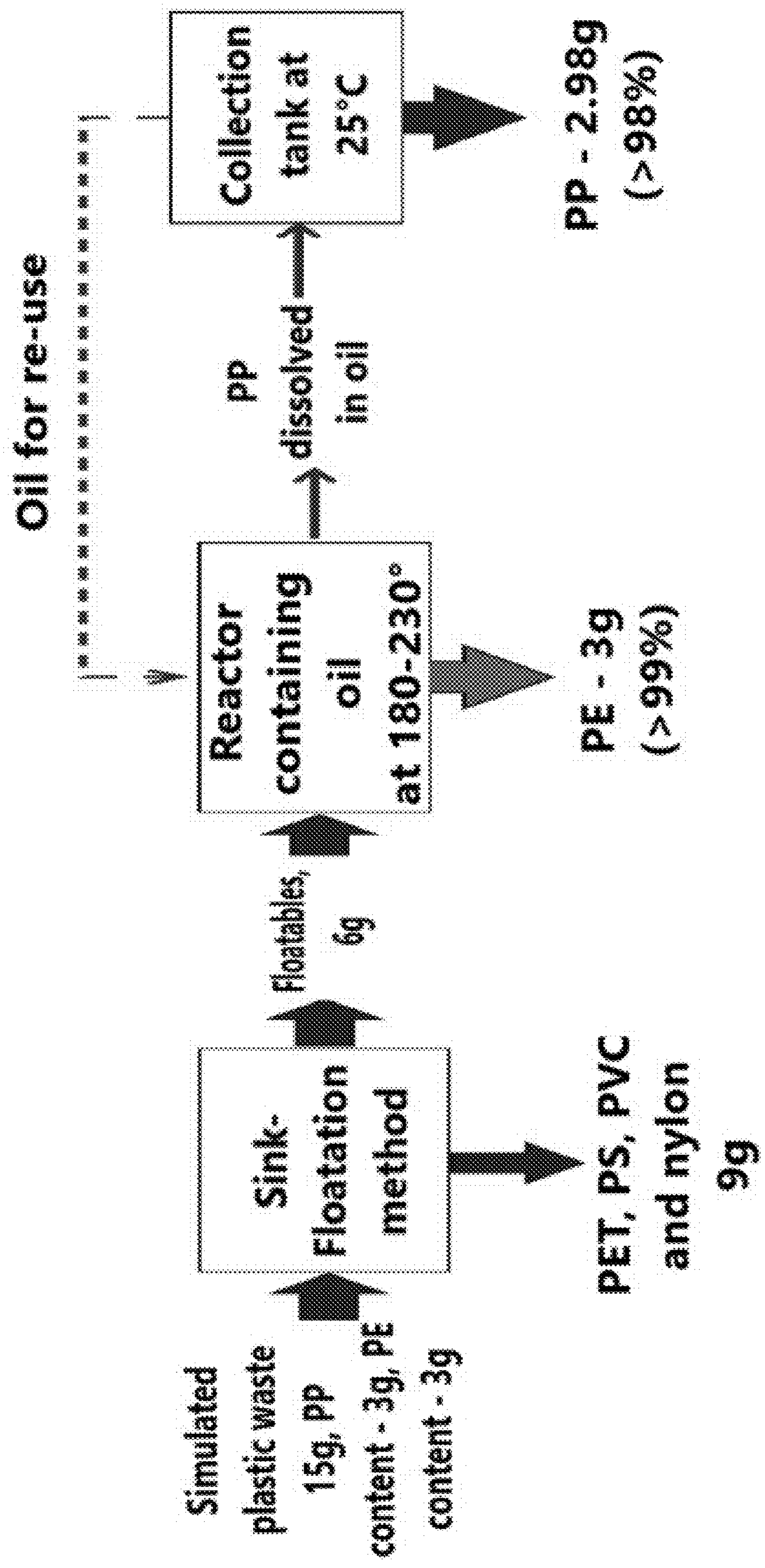
FIG. 3A: Total and component-mass balance data obtained from integrating the widely used sink-floatation method with the dissolution/re-precipitation method described herein to separate and recover PP and PE from mixed plastic waste.
Figure 3B:
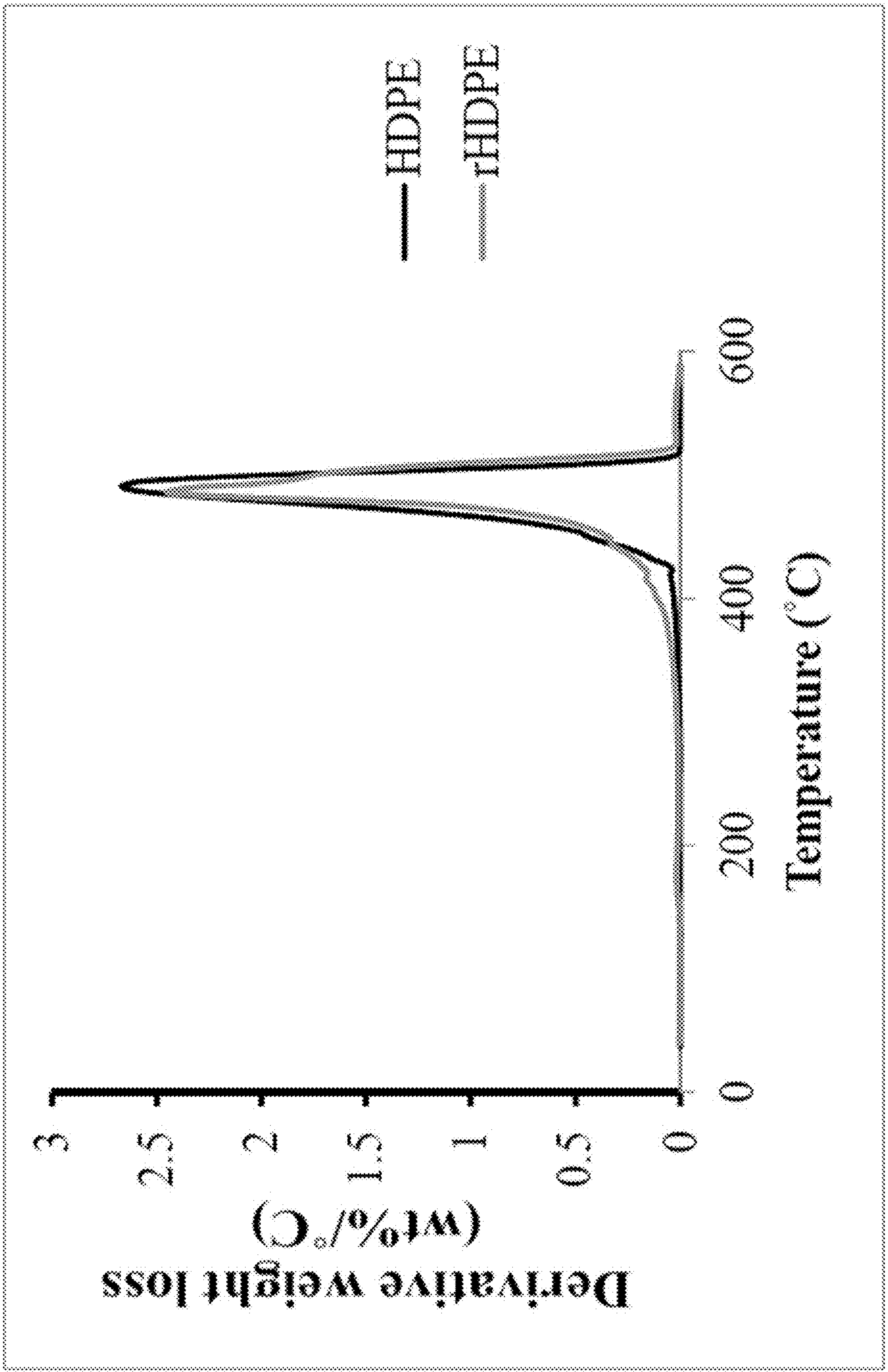
FIG. 3B: Thermal degradation profiles of pristine high-density polyethylene (HDPE) and recovered HDPE (rHDPE) produced from the method described herein.
Figure 3C:
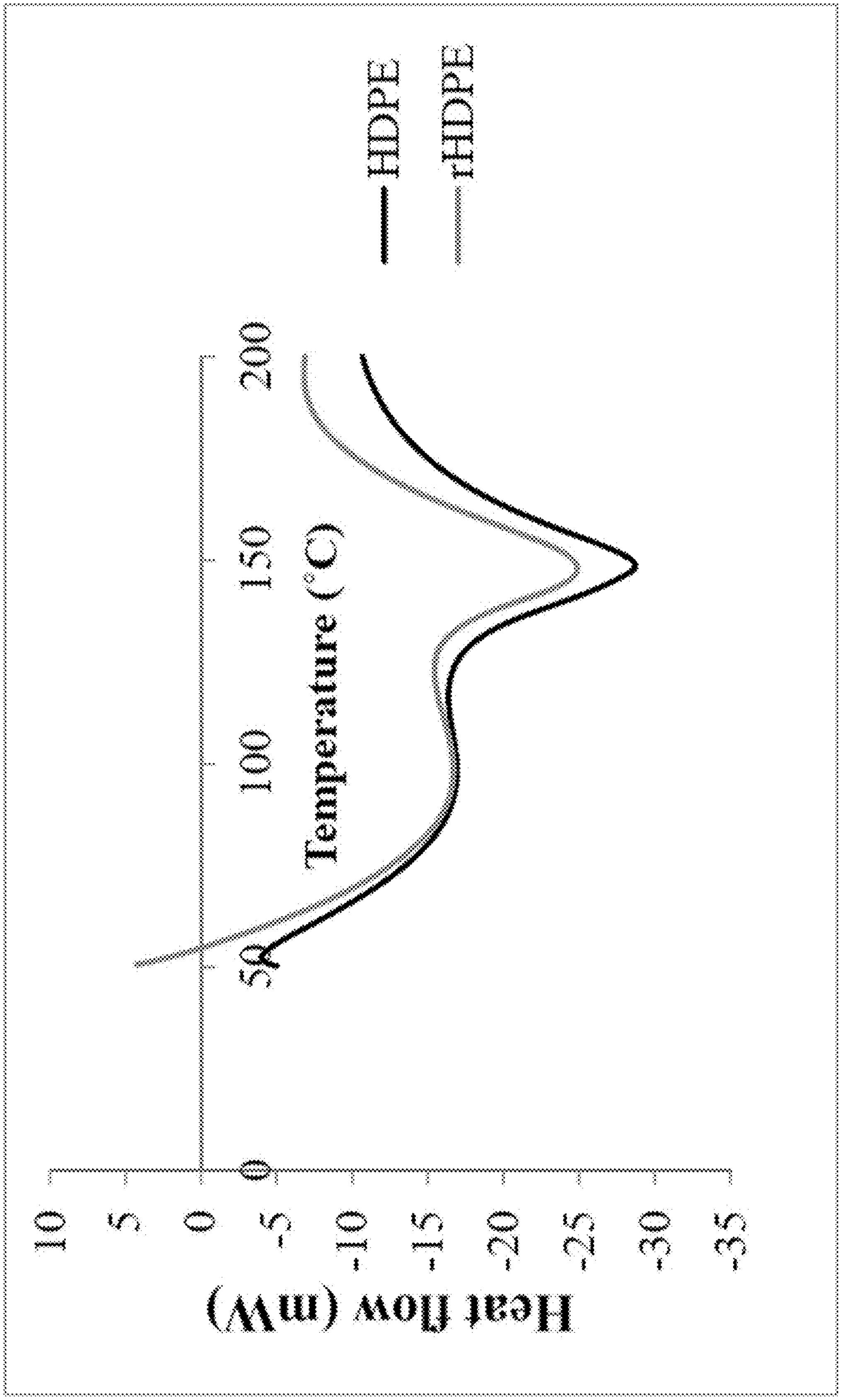
FIG. 3C: DSC profiles of pristine HDPE and recovered HDPE (rHDPE) produced from the dissolution/re-precipitation method described herein.
Figure 3D:
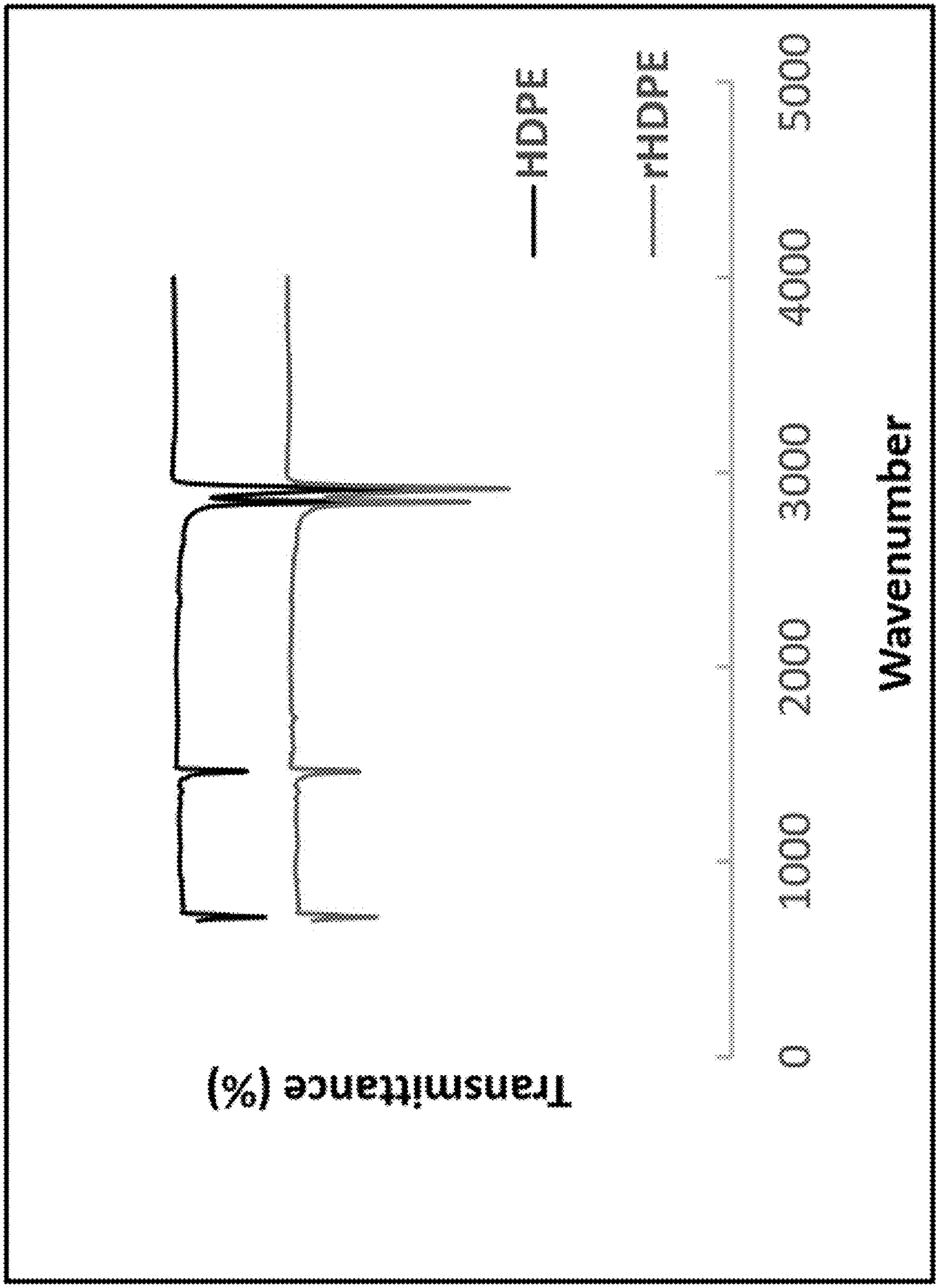
FIG. 3D: FTIR profiles of pristine HDPE and recovered HDPE (rHDPE) produced from the dissolution/re-precipitation method described herein.

The dissolution/re-precipitation method also has the ability to recover both PP and PE separately from mixed plastic wastes by integrating with the sink-floatation method. The sink-floatation method separates polyolefins from mixed plastic wastes and is widely used by plastic recycling companies. A polyolefin mixture containing PE and PP recovered from the sink-floatation method was incubated in waste cooking oil at 200 °C for 15 min to dissolve PP. Hot oil containing soluble PP was separated from the insoluble PE. Upon cooling the oil-PP solution to room temperature and addition of anti-solvent, PP re-precipitated and was separated. The mass balance of this experiment is shown in FIG. 3A, which demonstrates recovery of >99% of PP and PE separately that were present in the mixed plastic waste. Thermal properties and mechanical properties of recovered PP (FIGS. 2B, 2C) and PE (FIGS. 3B, 3C) from this dissolution/re-precipitation in waste oils/fats method were similar to pristine PP and HDPE material. Also, the molecular fingerprint (FTIR spectrum) of recycled HDPE from the dissolution/re-precipitation method were similar to virgin HDPE (see FIG. 3D). Therefore, the dissolution/re-precipitation technique using green solvents produces "virgin-like" quality of recycled PP and HDPE from mixed plastic wastes.

Example 3

Figure 4:
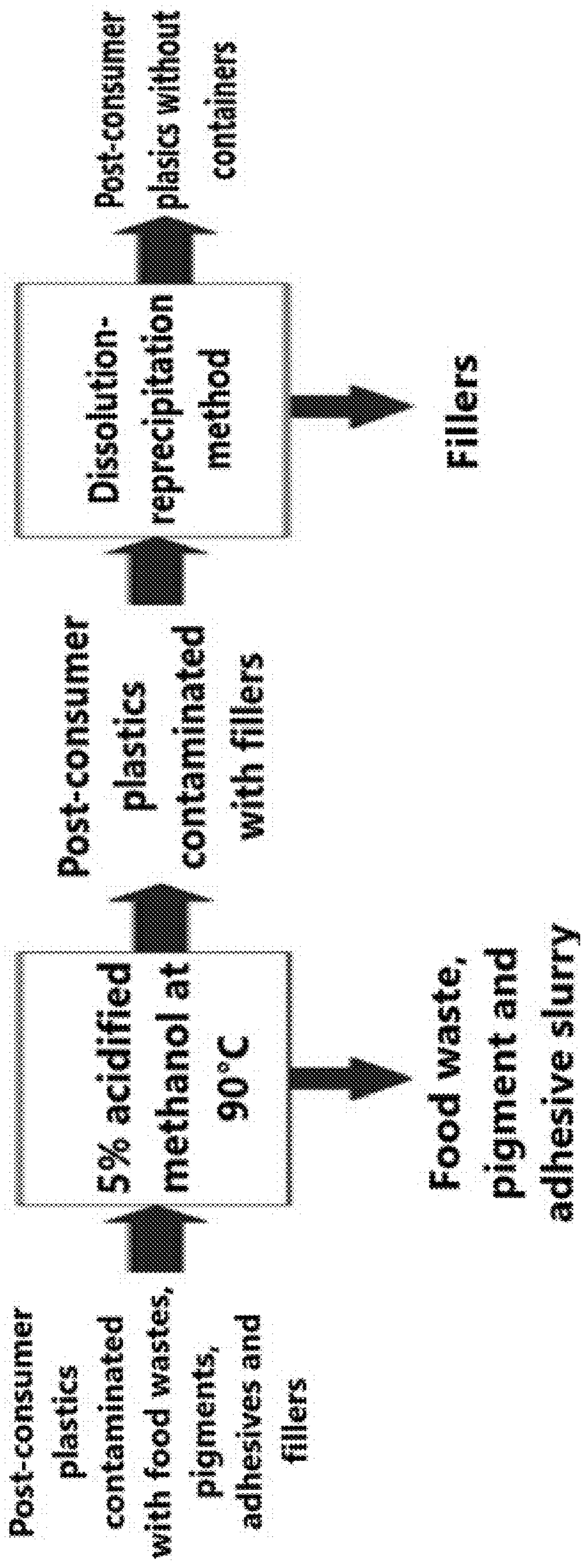
FIG. 4: Method for decontaminating pigments, adhesives, inorganics, and food wastes from post-consumer plastics. The illustrated method is an effective strategy to decontaminate pigments, adhesives, food waste, and inorganics from post-consumer plastics.

Post-consumer plastics are contaminated with pigments, adhesives, food residues and inorganic material (i.e., fillers) that may pose challenges to recycling as well as upcycling processes. A two-step process may be used to decontaminate post-consumer plastics, as shown in FIG. 4. During the first step, pigments, adhesives and food residues—primarily consists of starch, glucose, proteins, and lipids—are easily separated by incubating post-consumer plastic mixture in 5% acidified water or methanol or polar solvents at 90 °C for 90 min. During this process, pigments, adhesives and food residues completely dissolve in acid solutions while the plastics remain intact. (Plastics do not degrade in acidified aqueous and methanol solutions around the temperature of 90 °C). Therefore, post-consumer plastic without pigments, adhesives and food residues can be collected from the first-step of the process.

Post-consumer plastic has fillers or inorganic materials such as glass fibers, calcium carbonate, talc, mica muscovite, glass beads, carbon black, dolomite, zinc oxide, and titanium oxide to improve thermal/mechanical properties, and minimize permeability of oxygen and moisture. These fillers can be separated from plastic wastes by incubating in oil maintained in the temperature interval of 120-270 °C for 15-30 min. In this example, post-consumer PE was incubated in oil at 200 °C for 30 min. The recovered PE from thermal treatment in waste oils did not contain inorganic fillers. TG analysis of post-consumer PE with 2.7 wt % fillers before and after thermal treatment in waste cooking oil at 200 °C demonstrates the feasibility of fillers separation from post-consumer plastics.

As mentioned in Example 2 above, the dissolution/re-precipitation method also has the ability to recover both PP and PE separately from mixed plastic wastes by integrating with the sink-floatation method. The following examples (example 4, 5, 6, and 7) utilized real world plastic wastes which were subjected to this dissolution/re-precipitation method to recover PP and PE (where applicable).

Example 4

Figure 5A:
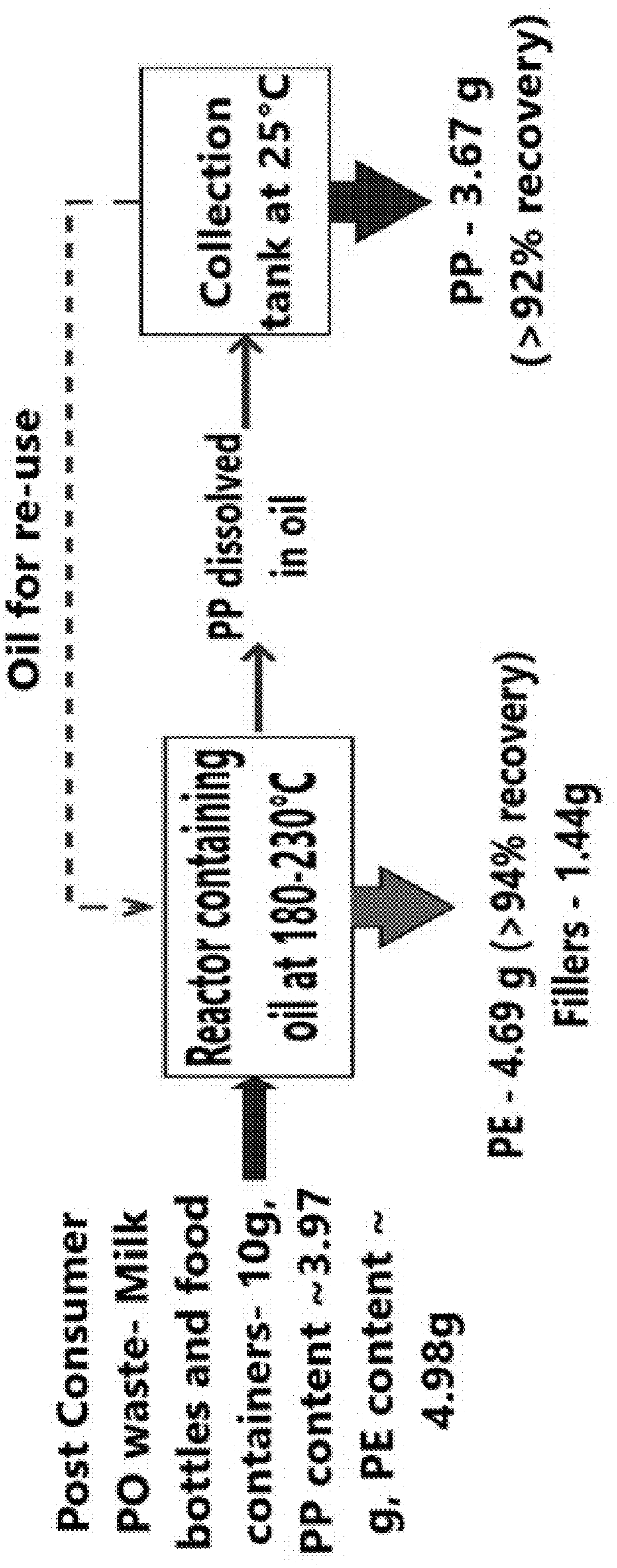
FIG. 5A: Method for recovery of PP and PE from a polyolefin mixture containing post-consumer PE milk bottles and post-consumer PP food containers.
Figure 5B:
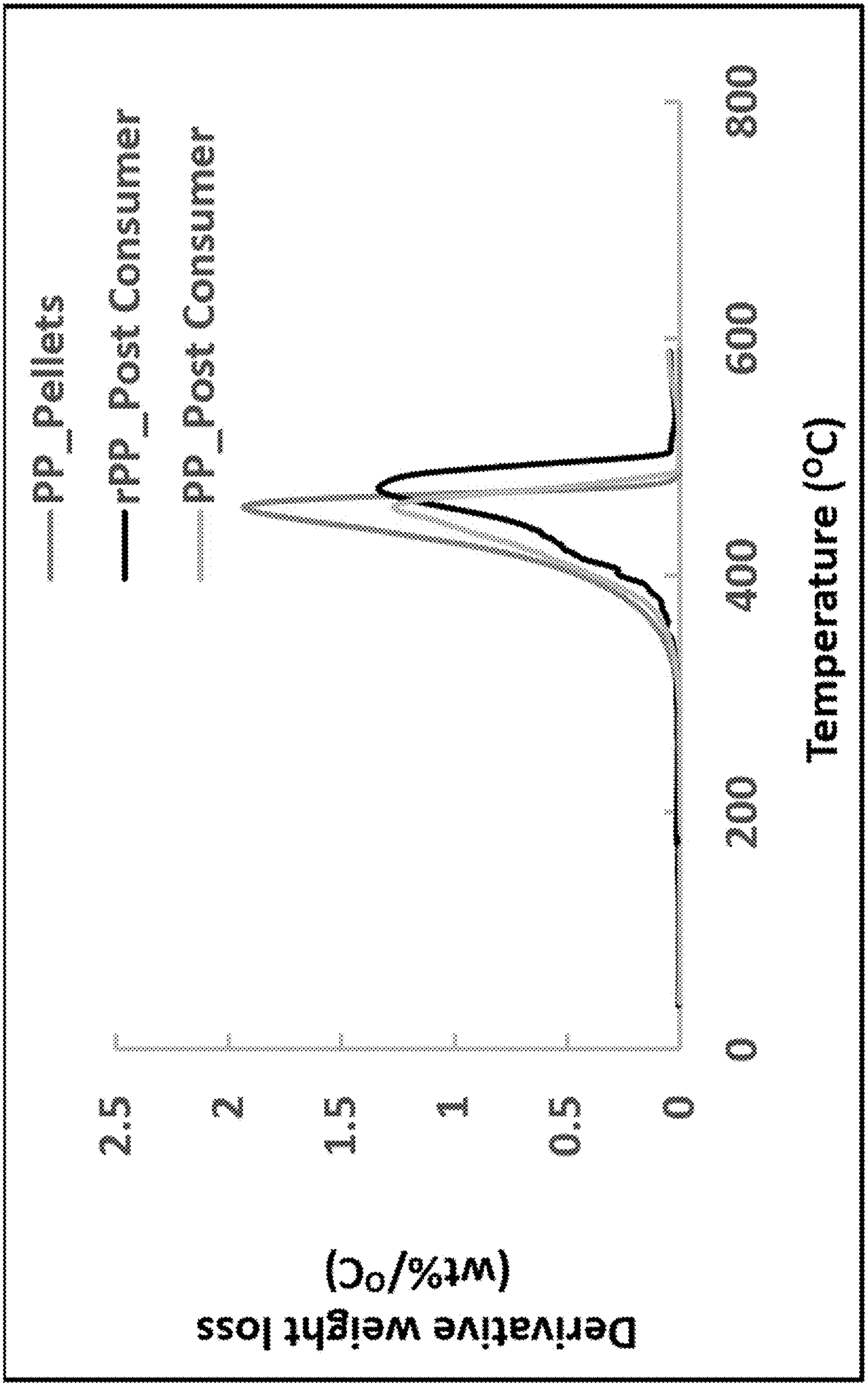
FIG. 5B: Thermal degradation profiles pristine PP, post-consumer PP, and recovered post-consumer PP produced from the dissolution/re-precipitation method described herein.
Figure 5C:
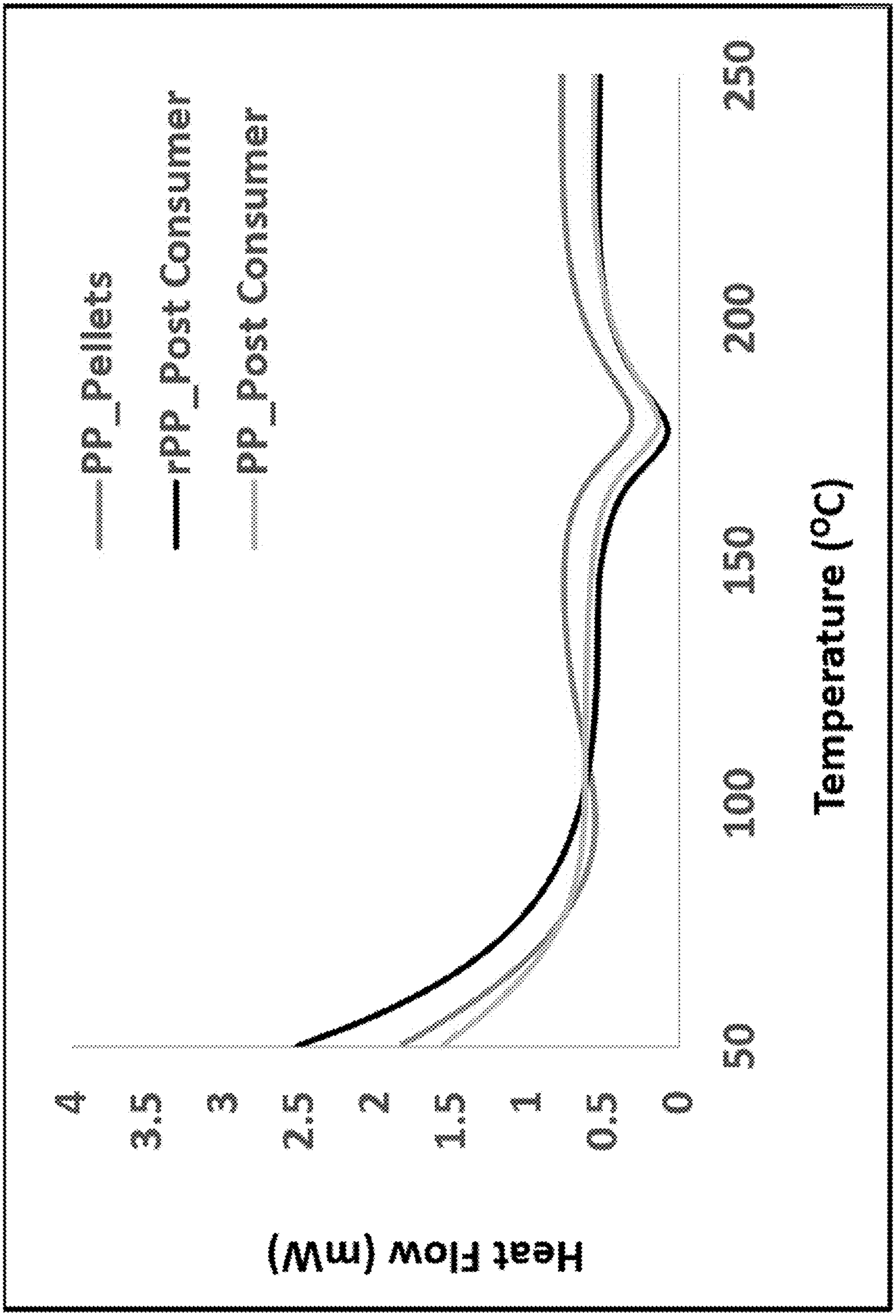
FIG. 5C: DSC profiles of pristine PP, post-consumer PP, and recovered post-consumer PP produced from the dissolution/re-precipitation method described herein.
Figure 5D:
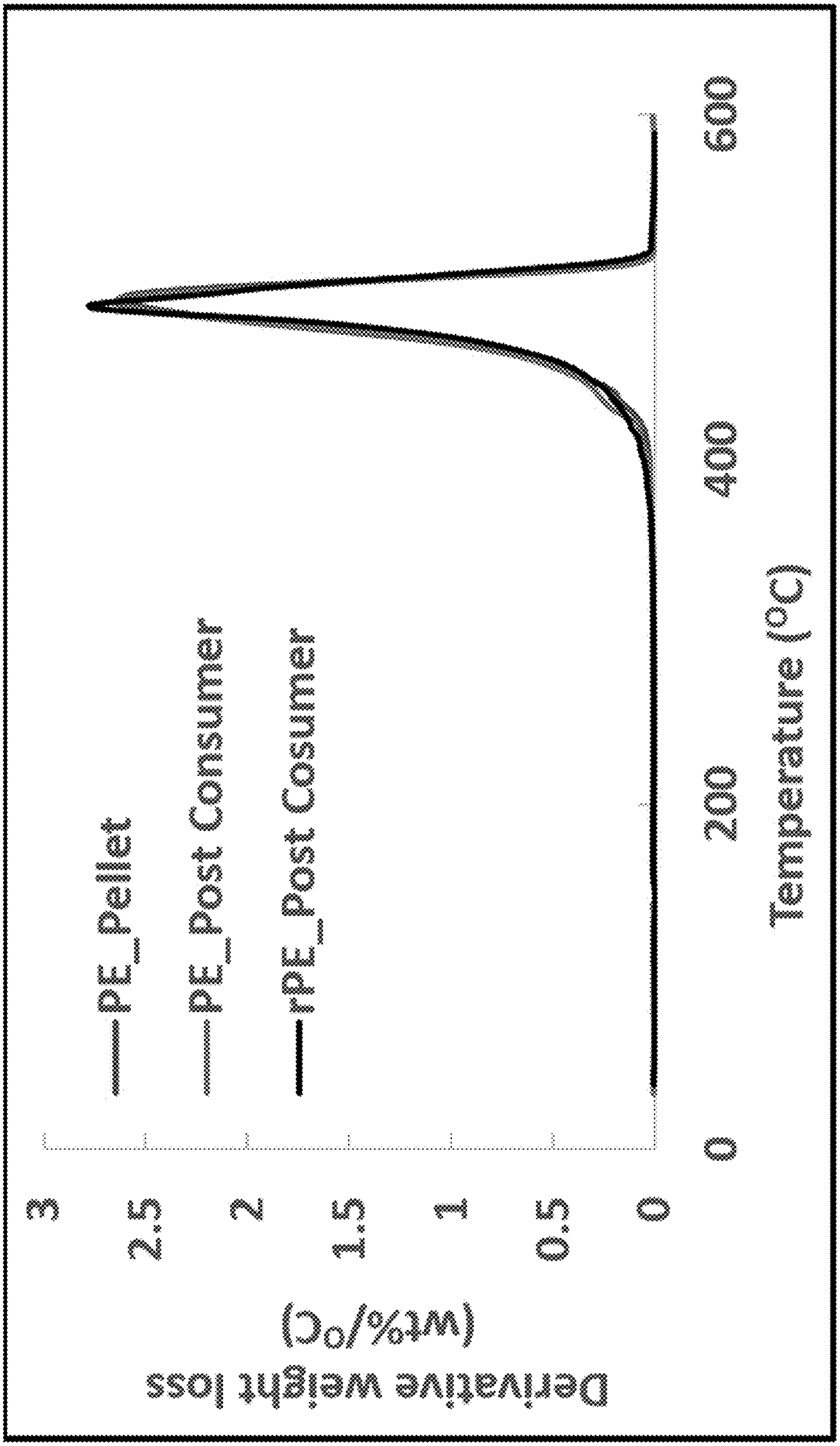
FIG. 5D: Thermal degradation profiles pristine PE, post-consumer PE and recovered post-consumer PE produced from the dissolution/re-precipitation method described herein.
Figure 5E:
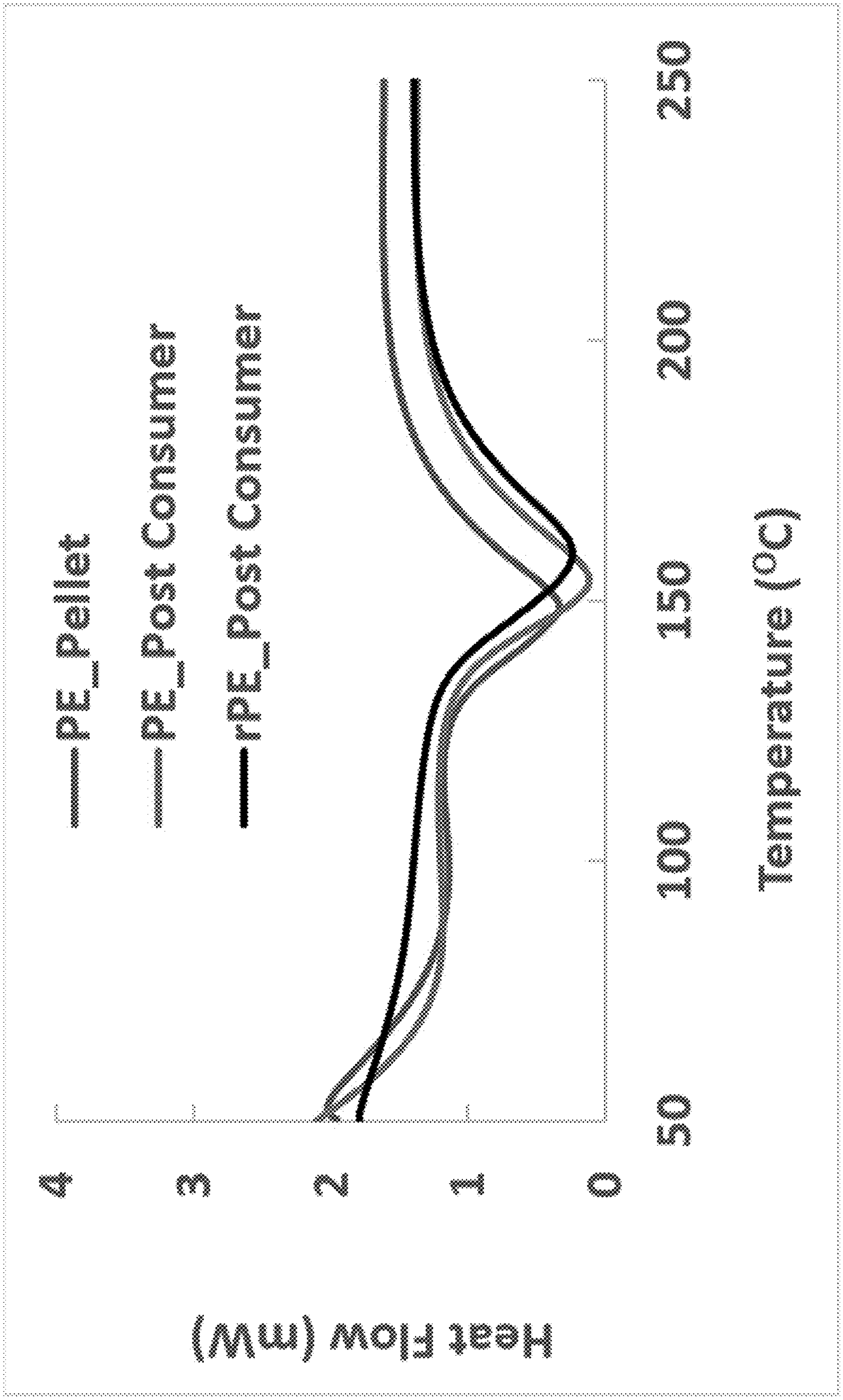
FIG. 5E: DSC profiles of pristine PE, post-consumer PE, and recovered post-consumer PE produced from the dissolution/re-precipitation method described herein.
Figure 5F:
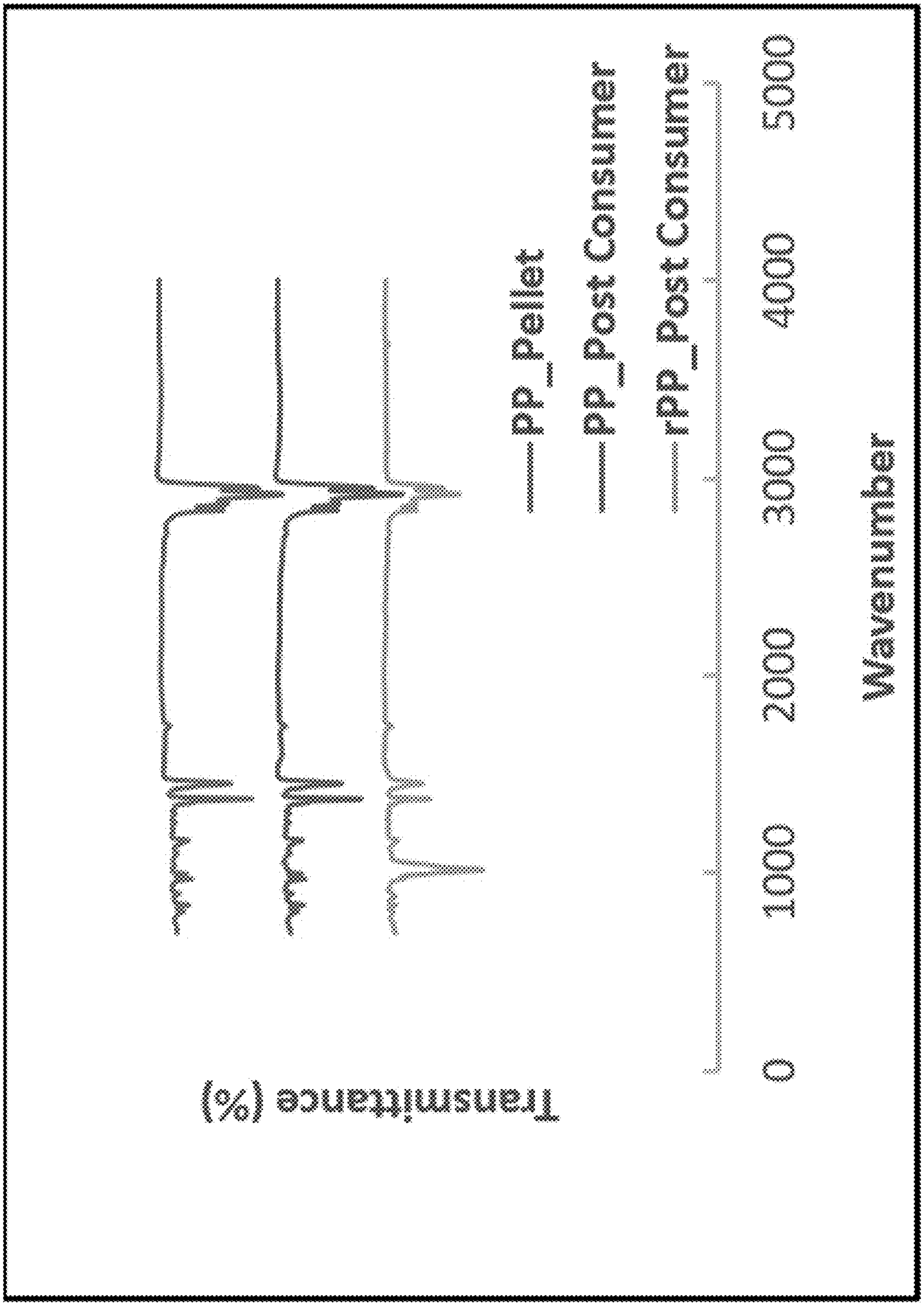
FIG. 5F: FTIR profiles of pristine PP, post-consumer PP, and recovered post-consumer PP produced from the dissolution/re-precipitation method described herein.
Figure 5G:
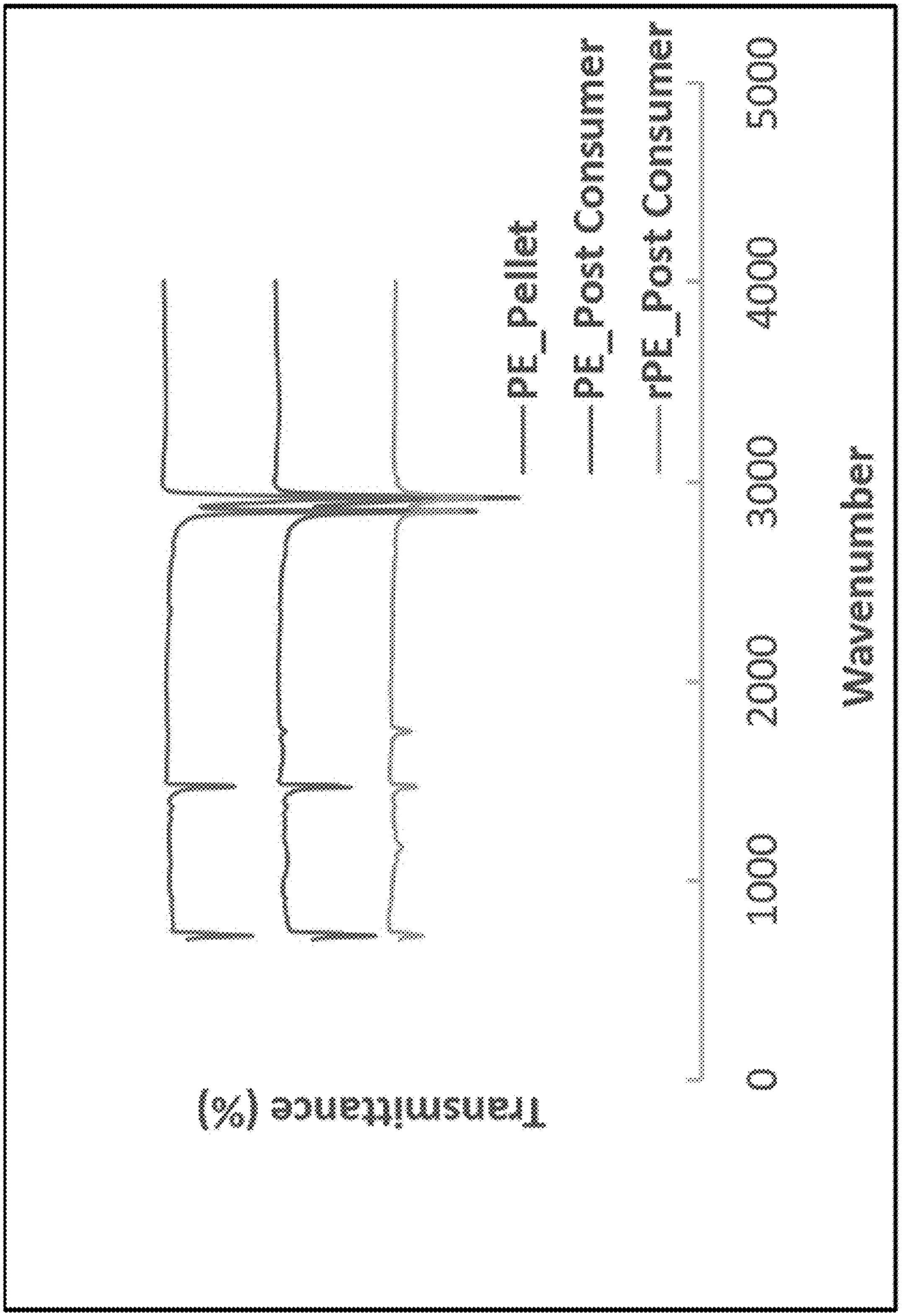
FIG. 5G: FTIR profiles of pristine PE, post-consumer PE, and recovered post-consumer PE produced from the dissolution/re-precipitation method described herein.

PE milk bottles and PP food containers are widely used as household single use plastic objects. TG analysis of post-consumer PE indicates ~0.2 wt % $TiO_2$ filler and TG analysis of post-consumer PP indicates ~22 wt % talc filler. The dissolution/re-precipitation method also has the ability to recover both PP and PE separately from mixed plastic wastes. A polyolefin mixture containing post-consumer PE milk bottles and post-consumer PP food containers was caustic washed and cut into 4×4 mm flakes. This post-consumer polyolefins waste was then incubated in waste cooking oil at 200 °C for 20 min to dissolve PP. Oil containing PP was separated from the PE by gravity separation. Upon cooling the oil-PP solution to room temperature and addition of anti-solvent, PP re-precipitated, which was easily separated from the oil using solid-liquid operations. The mass balance of this experiment is shown in FIG. 5A, which demonstrates recovery of >92% of PP and >94% PE separately that were present in post-consumer polyolefins waste. Thermal properties of recovered PP (FIGS. 5B, 5C) and PE (FIGS. 5D, 5E) from this dissolution/re-precipitation in waste oils/fats method were similar to pristine PP and PE material and also similar to actual post-consumer PP and PE which was subjected to separation using green solvents. Also, the molecular fingerprint (FTIR spectrum) of recovered PP (FIG. 5F) and PE (FIG. 5G) from this dissolution/re-precipitation in waste oils/fats method was similar to pristine PP and PE material and also similar to actual post-consumer PP and PE. Therefore, the dissolution/re-precipitation technique using green solvents produces "virgin-like" quality of recycled PP and PE from post-consumer polyolefins waste.

Example 5

Figure 6A:
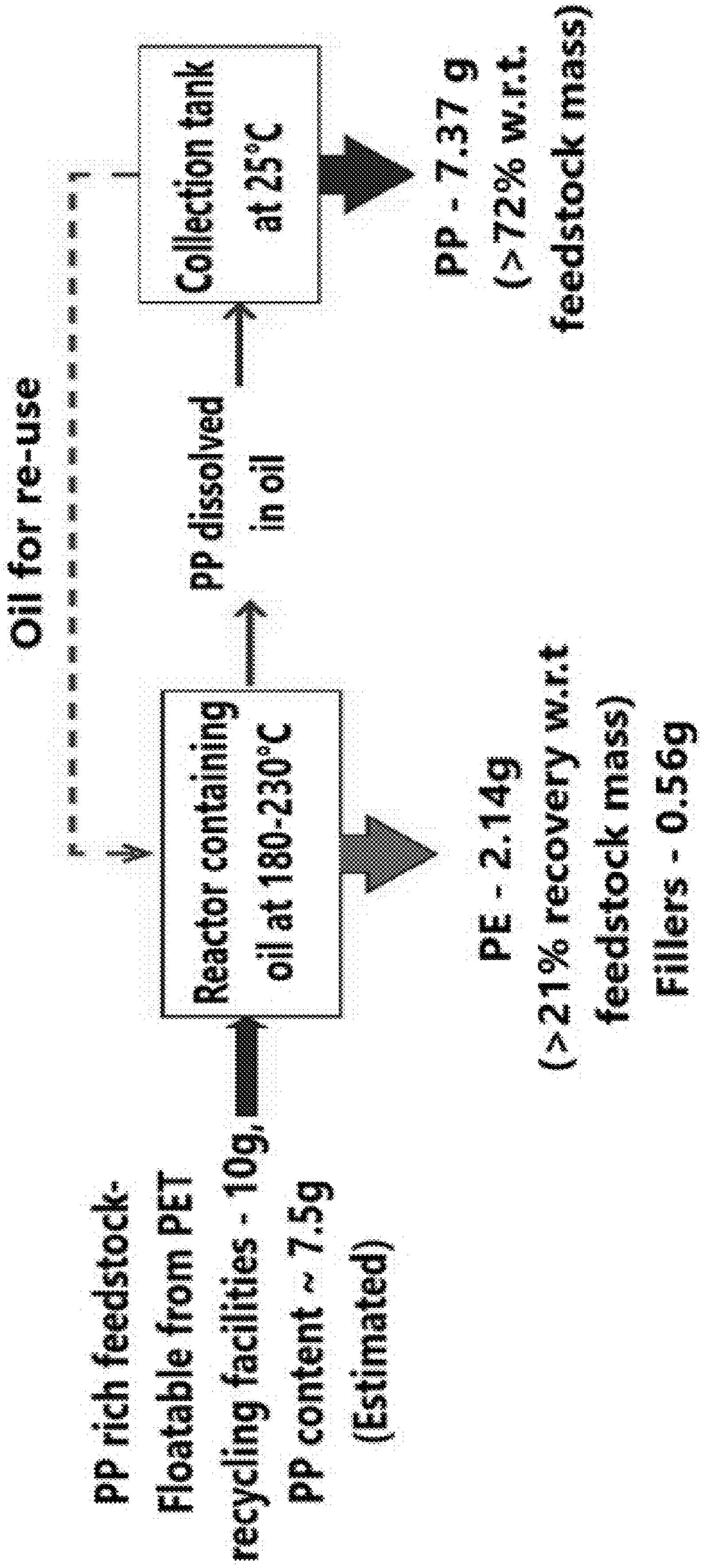
FIG. 6A: Mass balance from method for recovery of PP and PE from mixed polyolefin floats obtained from a commercial PET recycling process.
Figure 6B:
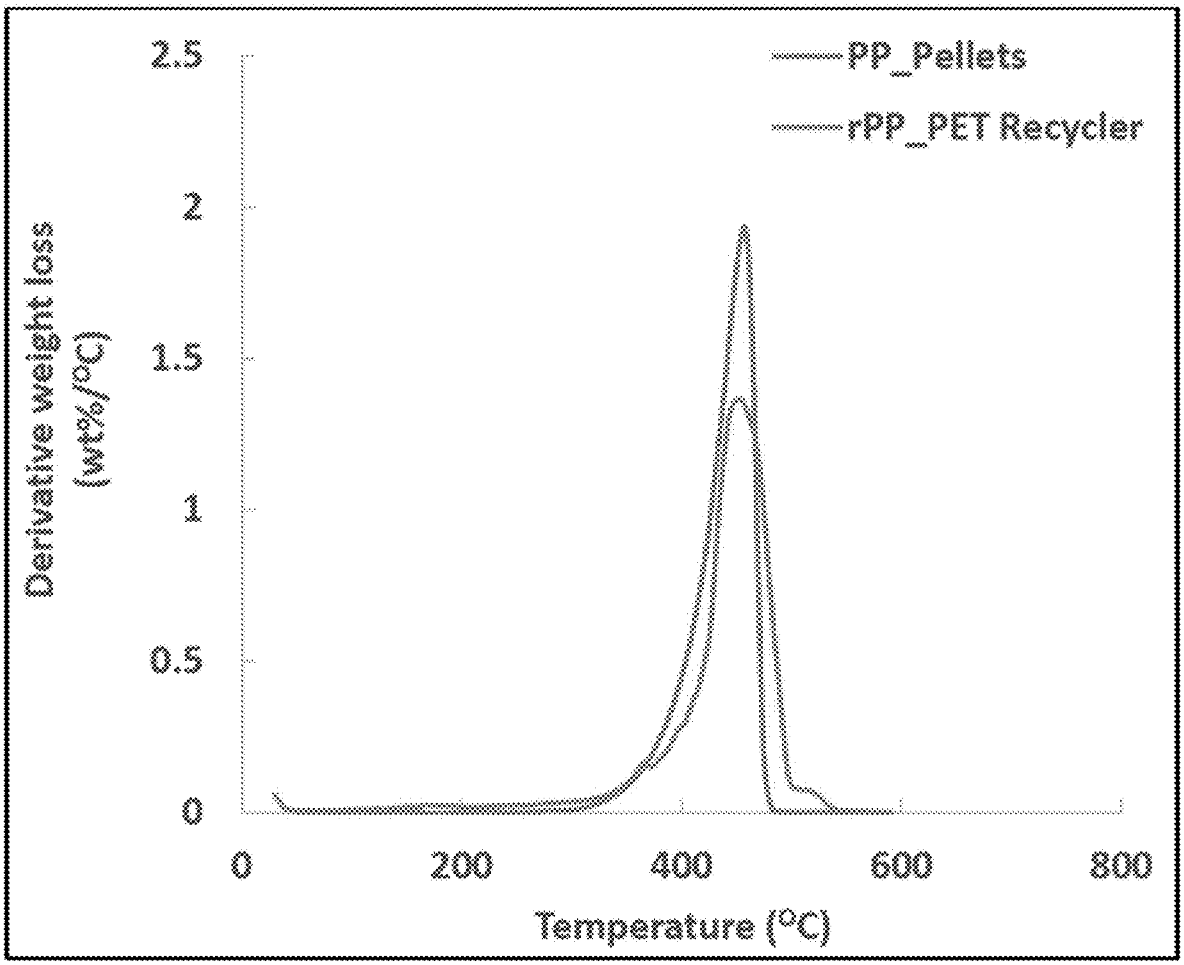
FIG. 6B: Thermal degradation profiles pristine PP, and recovered PP produced from mixed polyolefin floats obtained from a commercial PET recycling process.
Figure 6C:
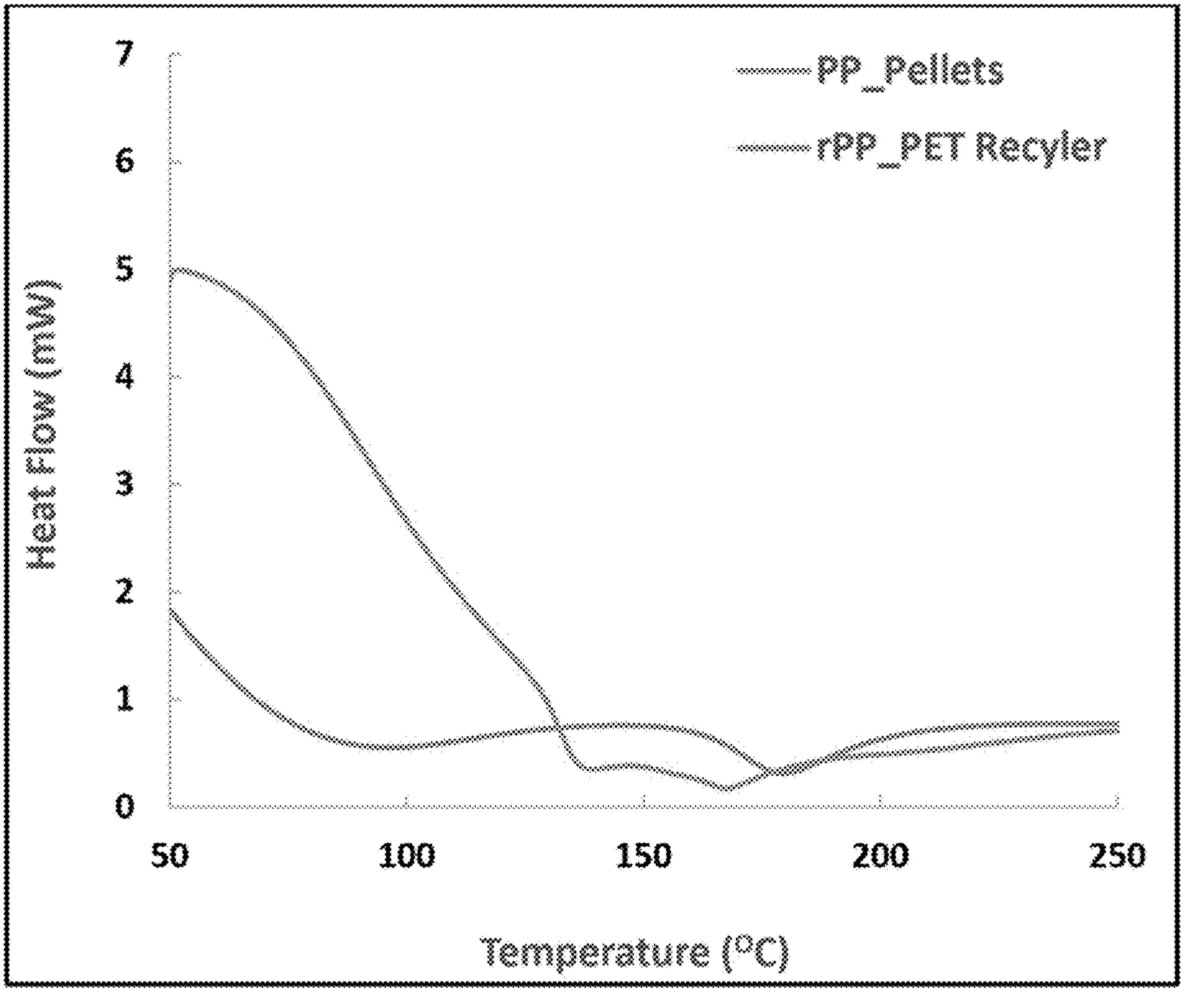
FIG. 6C: DSC profiles of pristine PP, and recovered PP produced from mixed polyolefin floats obtained from a commercial PET recycling process.
Figure 6D:
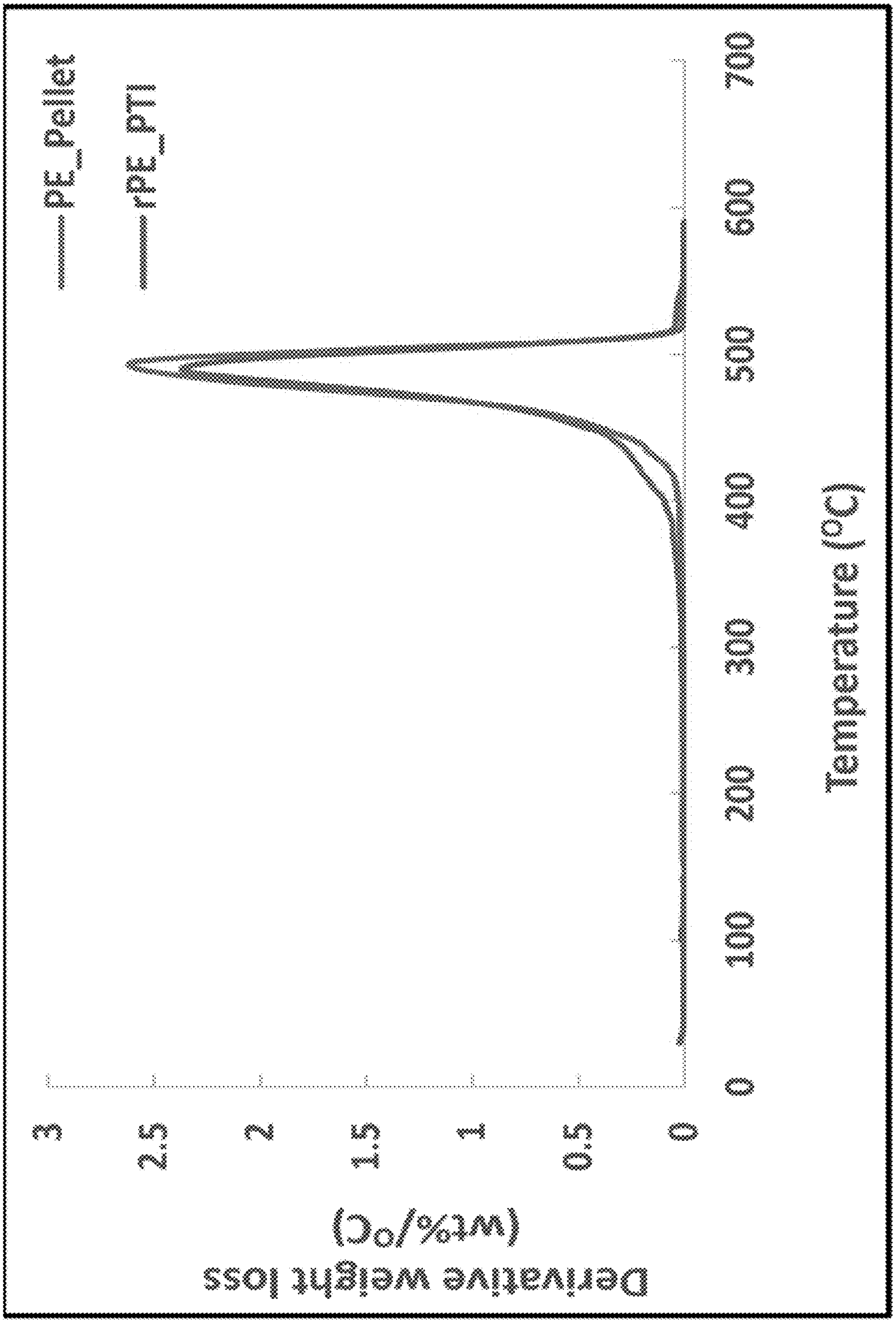
FIG. 6D: Thermal degradation profiles pristine PE, and recovered PE produced from mixed polyolefin floats obtained from a commercial PET recycling process.
Figure 6E:
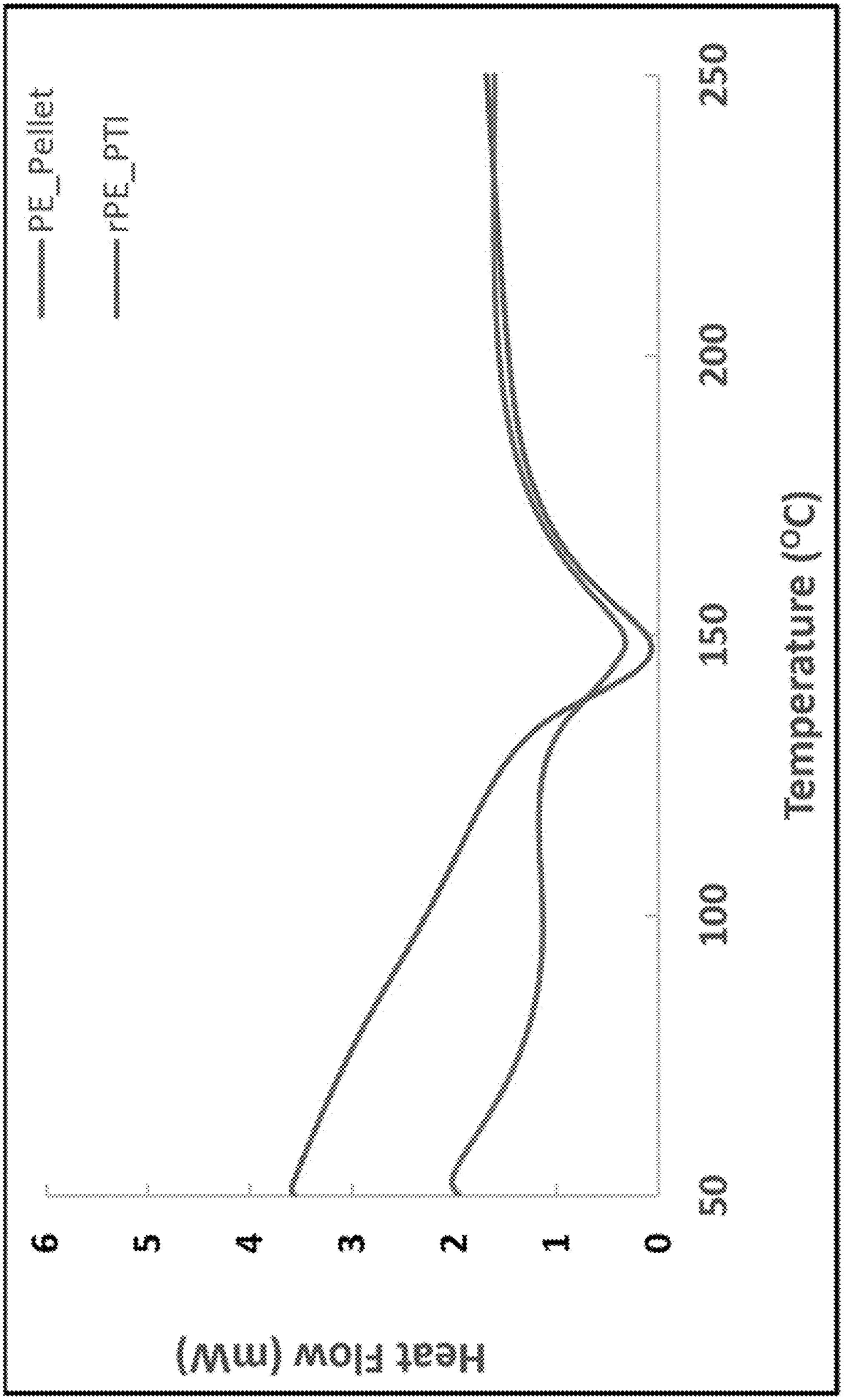
FIG. 6E: DSC profiles of pristine PE, and recovered PE produced from mixed polyolefin floats obtained from a commercial PET recycling process.
Figure 6F:
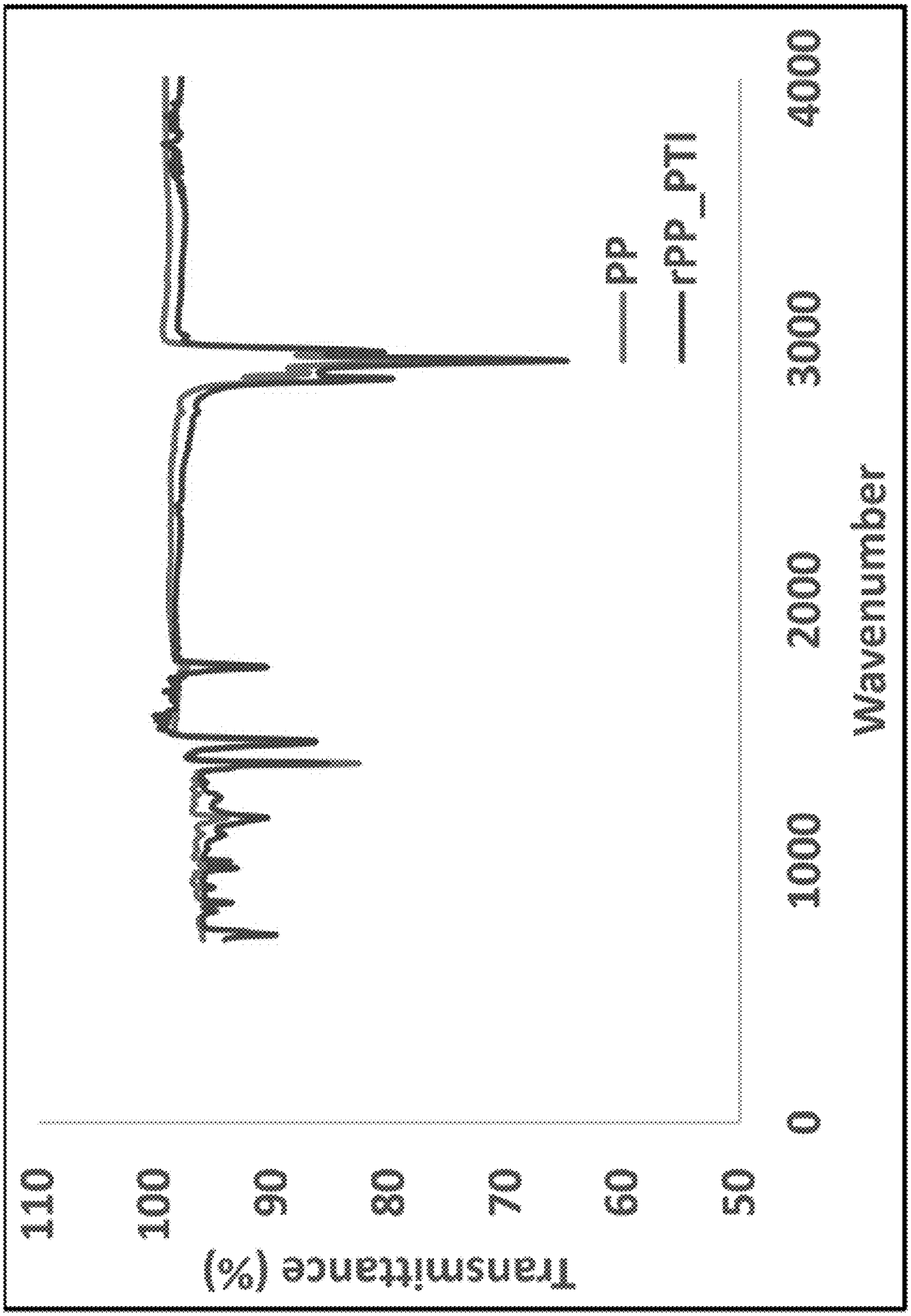
FIG. 6F: FTIR profiles of pristine PP, and recovered PP produced from mixed polyolefin floats obtained from a commercial PET recycling process.
Figure 6G:
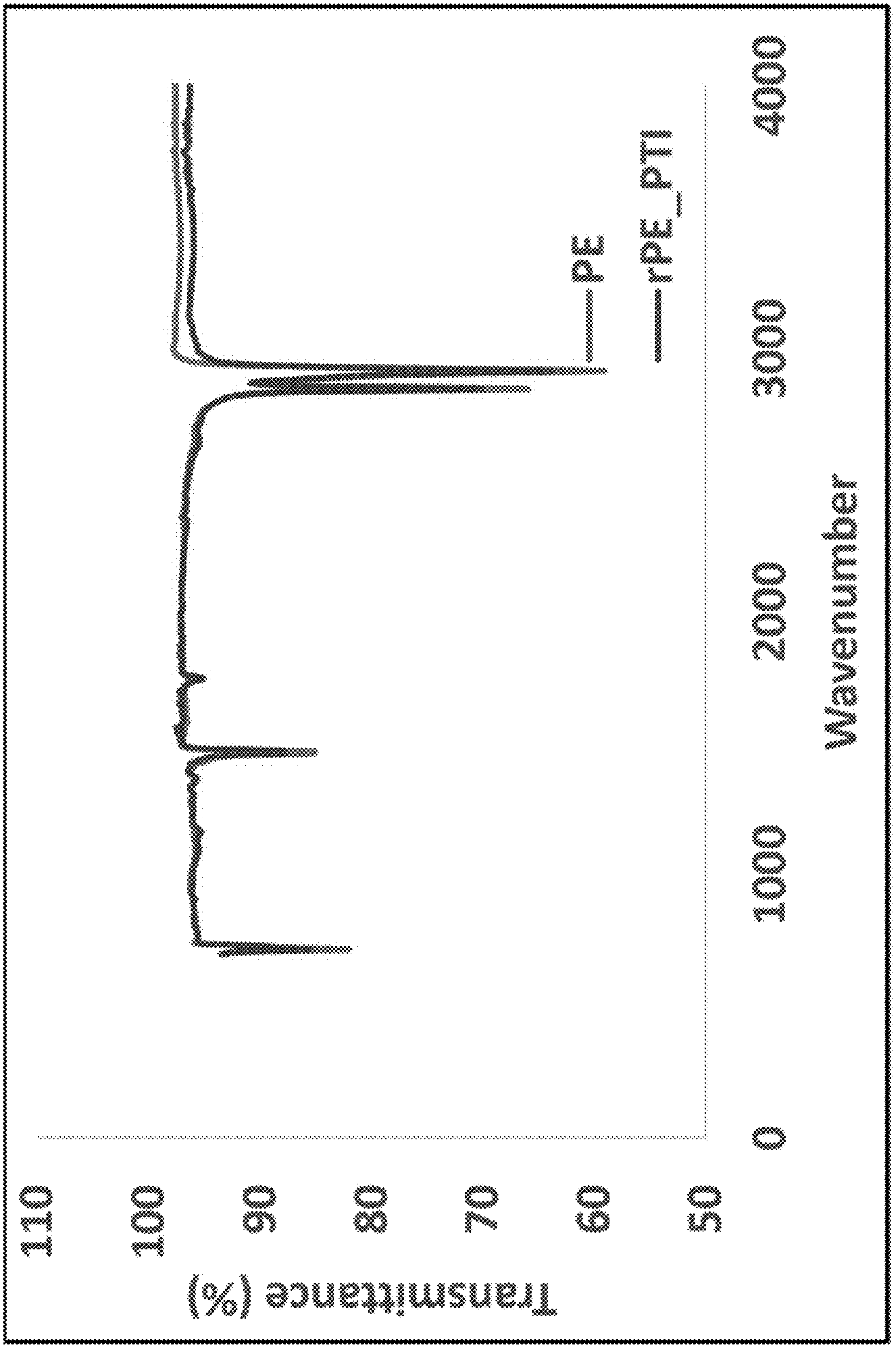
FIG. 6G: FTIR profiles of pristine PE, and recovered PE produced from mixed polyolefin floats obtained from a commercial PET recycling process.

Polyolefins waste from PET recycler is floats obtained from a commercial PET recycling plant. This feedstock was provided by a Toledo based PET recycling company. These floats usually contain bottle caps and liner material. However, the exact composition of PP and PE in this feedstock was unknown. Along with PP and PE, this feedstock also contained various fillers, pigments, and other additives. This feedstock was used as received. This polyolefin waste was then incubated in waste cooking oil at 220 °C for 15 min to dissolve PP. Oil containing PP was separated from PE by gravity separation. Upon cooling the oil-PP solution to room temperature and addition of anti-solvent, PP re-precipitated, which was separated from the oil using solid-liquid operations. The mass balance of this experiment is shown in FIG. 6A, which demonstrates recovery of >72% of PP based on initial feed mass. Thermal properties of recovered PP (FIGS. 6B, 6C) and PE (FIGS. 6D, 6E) from this dissolution/re-precipitation in waste oils/fats method were similar to pristine PP and PE. Also, the molecular fingerprint (FTIR spectrum) of recovered PP (FIG. 6F) and PE (FIG. 6G) from this dissolution/re-precipitation in waste oils/fats method was similar to pristine PP and PE material. Therefore, the dissolution/re-precipitation technique using oil produces "virgin-like" quality of recycled PP and PE from polyolefin waste from PET recycler.

Example 6

Figure 7A:
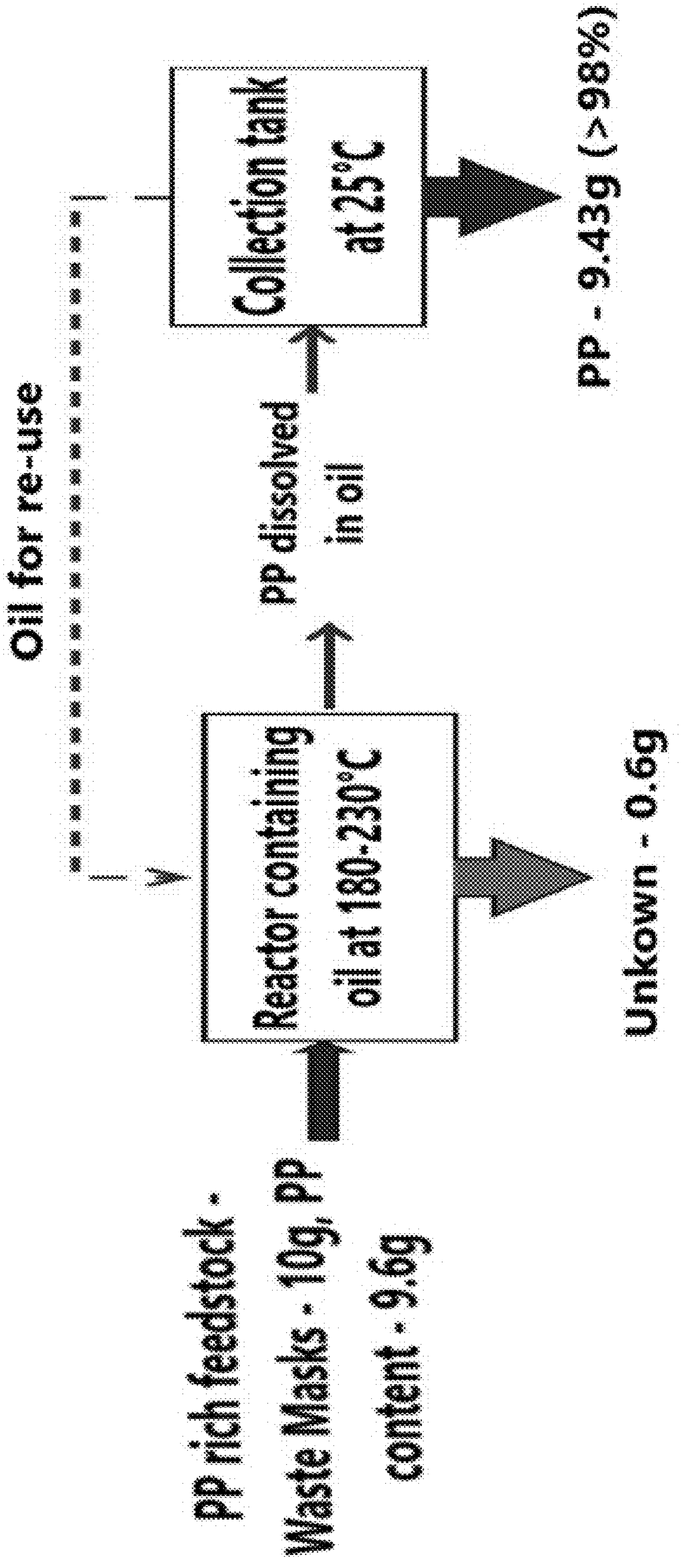
FIG. 7A: Mass balance from method for recovery of PP from surgical masks—a PP rich material.
Figure 7B:
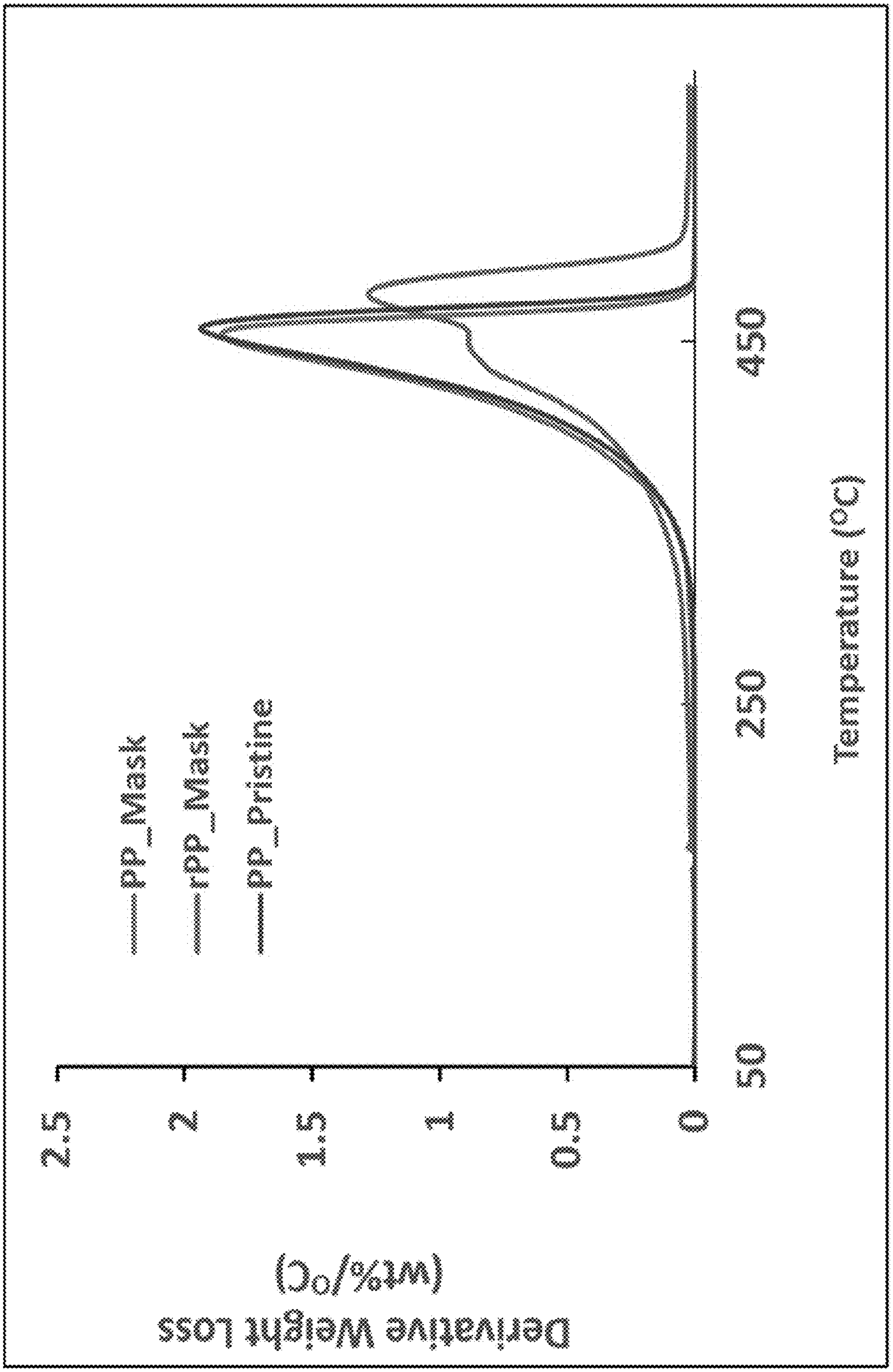
FIG. 7B: Thermal degradation profiles pristine PP, waste PP in the form of masks, and recovered PP produced from the dissolution/re-precipitation method described herein.
Figure 7C:
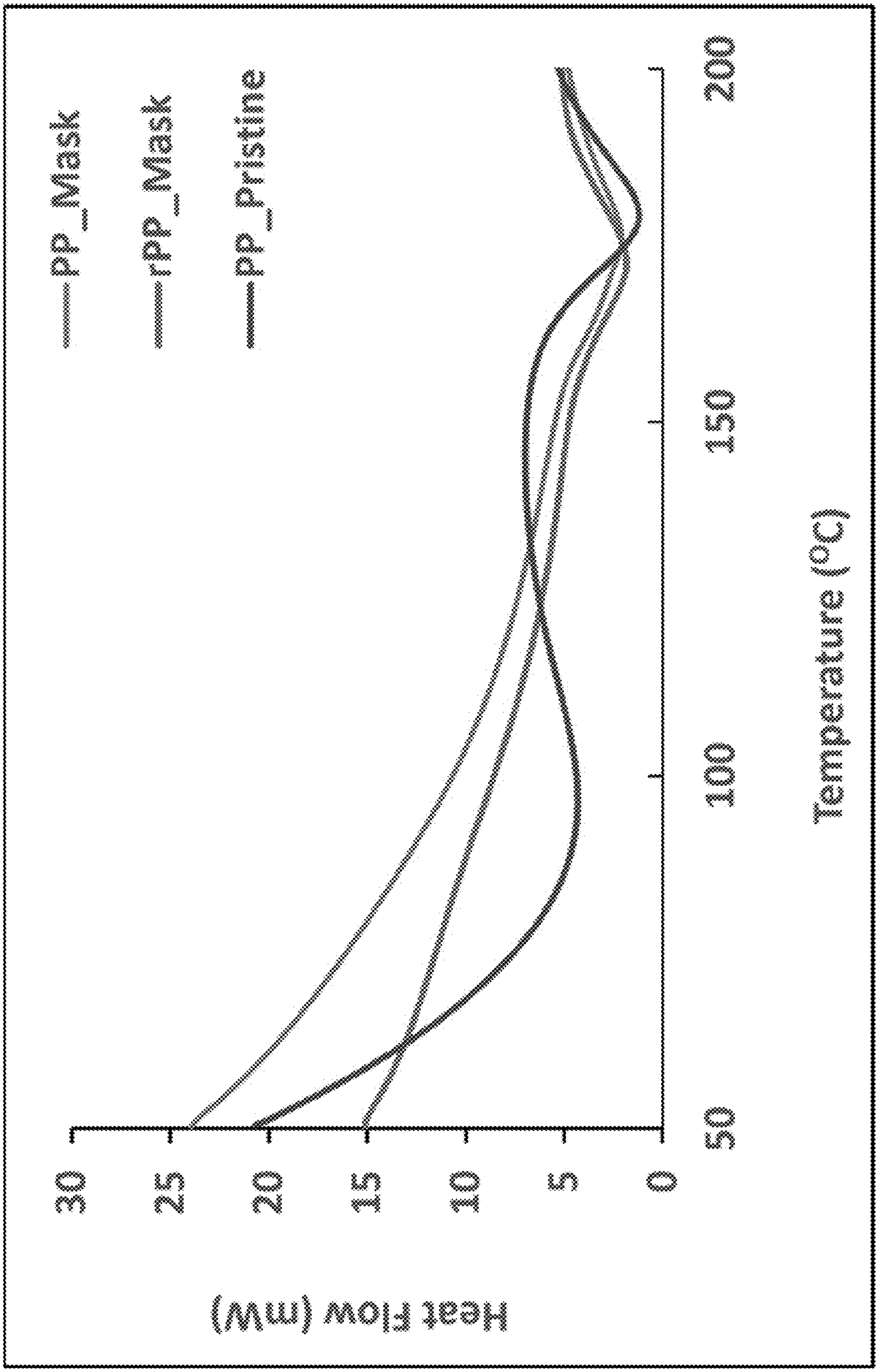
FIG. 7C: DSC profiles of pristine PP, waste PP in the form of masks, and recovered PP produced from the dissolution/re-precipitation method described herein.
Figure 7D:
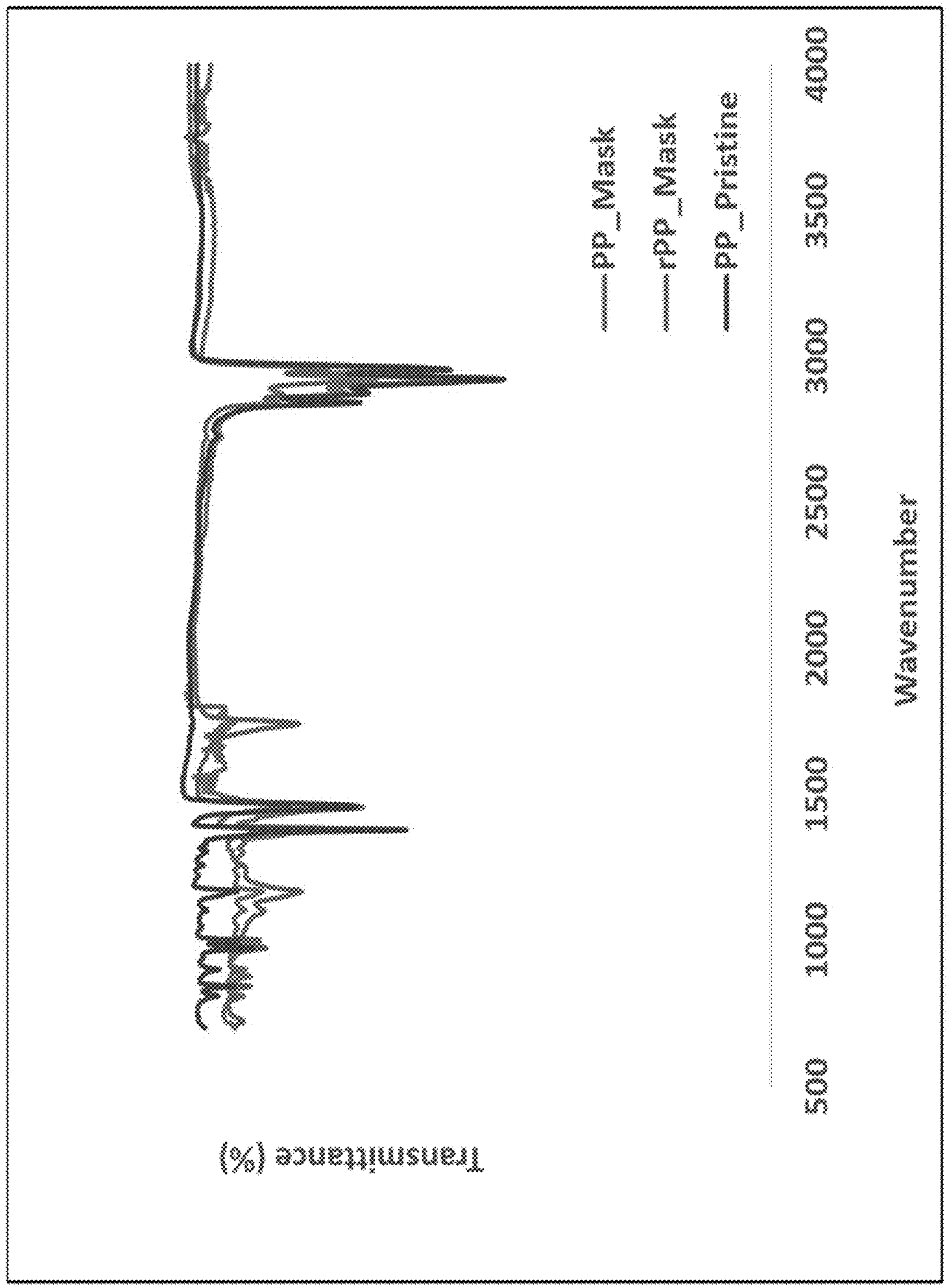
FIG. 7D: FTIR profiles of pristine PP, waste PP in the form of masks, and recovered PP produced from the dissolution/re-precipitation method described herein.

Nonwoven PP is used in surgical masks because it is nontoxic, breathable, hydrophobic (water-resistant), lightweight, and provides filtration. These masks have been used and discarded by people at an accelerated rate especially due to the Covid-19 pandemic. TG analysis of surgical masks also confirm the PP content present in masks. The dissolution/re-precipitation method also has the ability to recover PP from mixed plastic wastes or PP rich waste streams. Waste PP masks were cut into 4×4 mm flakes and then incubated in waste cooking oil at 200 °C for 15 min to dissolve PP. Oil containing PP was separated from the rest of the materials by gravity separation. Upon cooling the oil-PP solution to room temperature and addition of anti-solvent, PP re-precipitated, which was easily separated from the oil using solid-liquid operations. The mass balance of this experiment is shown in FIG. 7A, which demonstrates recovery of >98% of PP that were present in mixed plastic wastes or PP rich waste streams. Thermal properties of recovered PP (FIGS. 7B, 7C) from this dissolution/re-precipitation in waste oils/fats method were similar to pristine PP also similar to waste PP used as feedstock. Also, the molecular fingerprint (FTIR spectrum) of recovered PP (FIG. 7D) from this dissolution/re-precipitation in waste oils/fats method was similar to pristine PP also similar to waste PP used as feedstock. Therefore, the dissolution/re-precipitation technique using green solvents produces "virgin-like" quality of recycled PP from mixed plastic wastes or PP rich waste streams.

Example 7

Figure 8A:
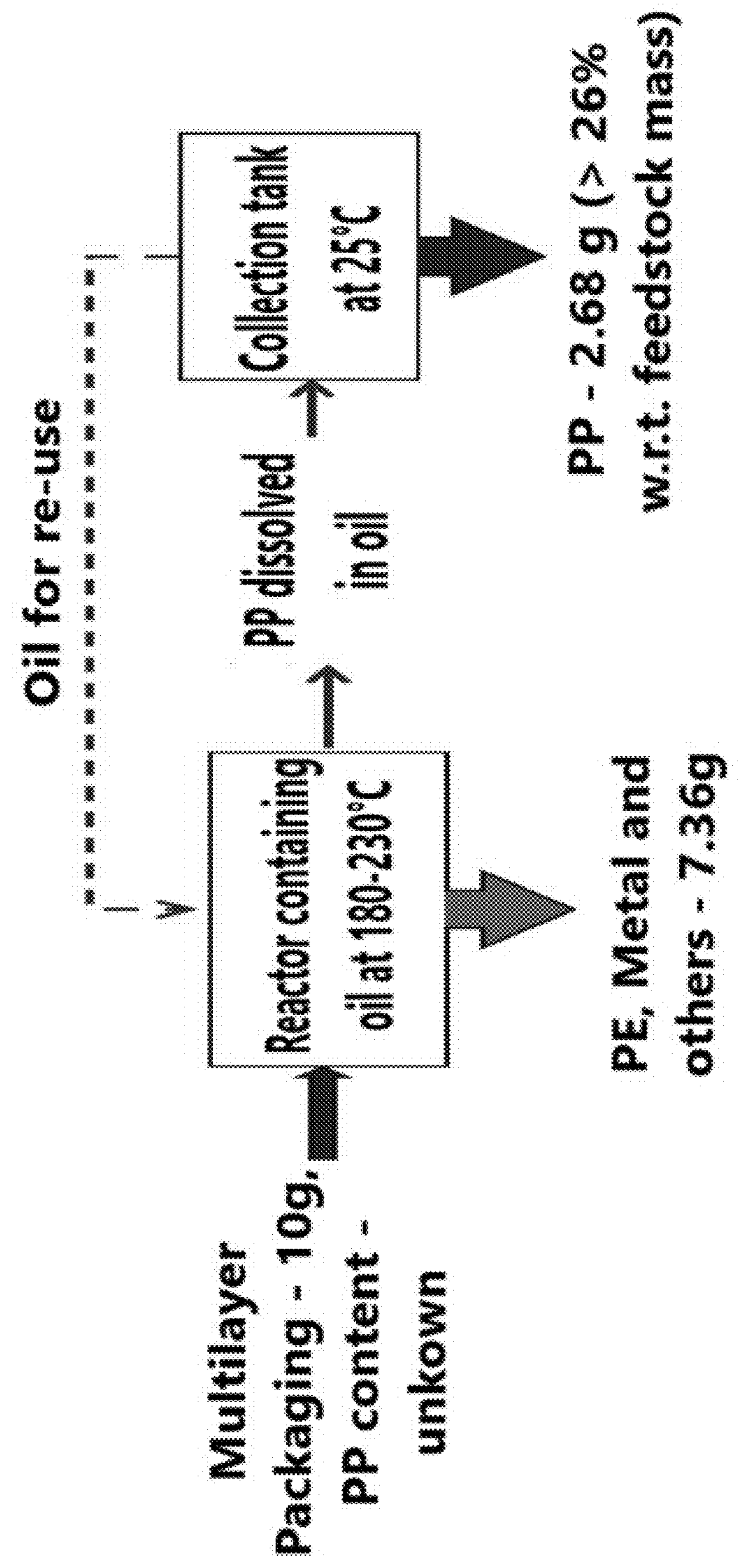
FIG. 8A: Mass balance from non-limiting example method for recovery of PP from MLP.
Figure 8B:
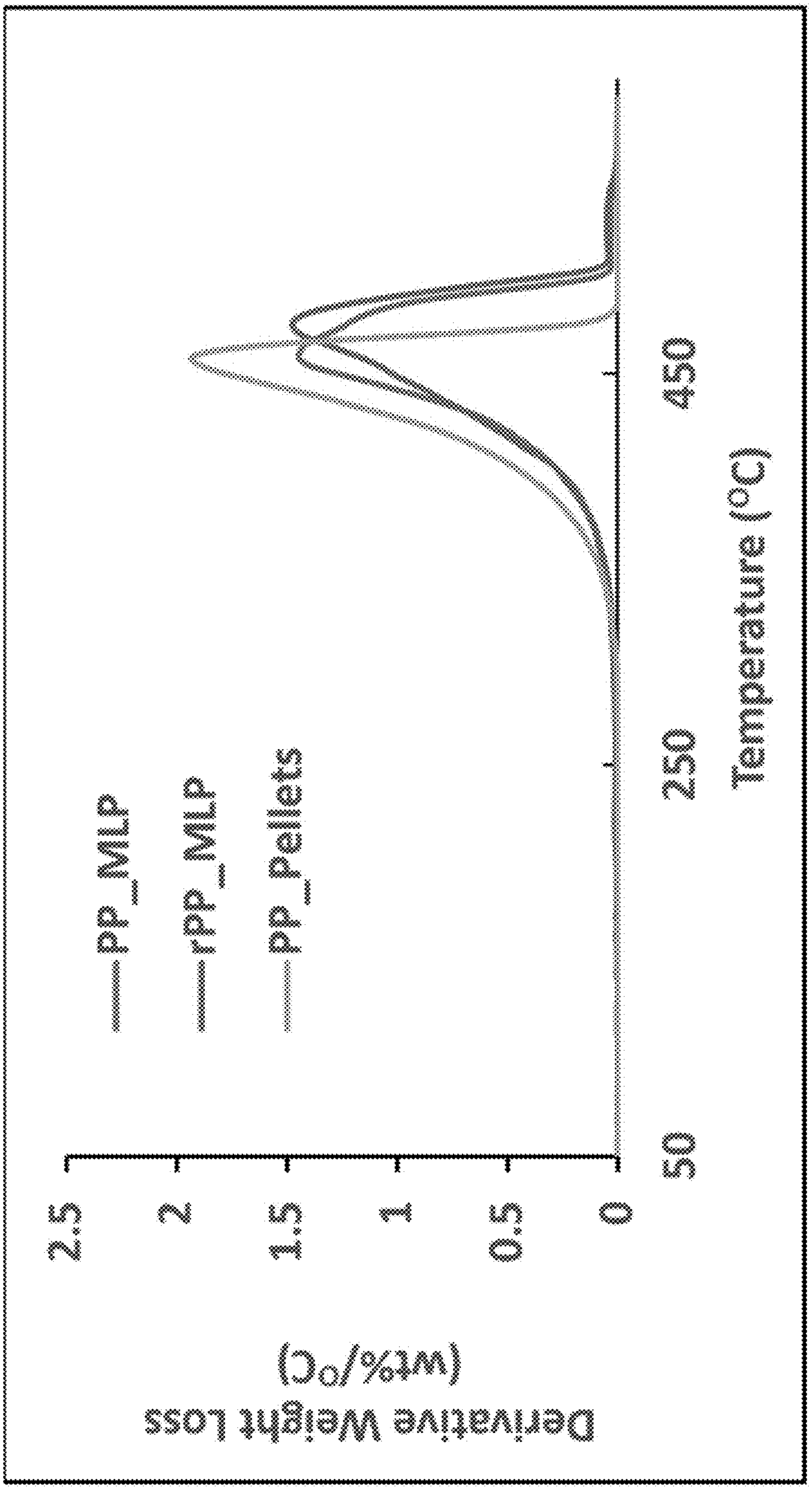
FIG. 8B: Thermal degradation profiles pristine PP, waste PP present within feedstock MLP, and recovered PP produced from the dissolution/re-precipitation method described herein.
Figure 8C:
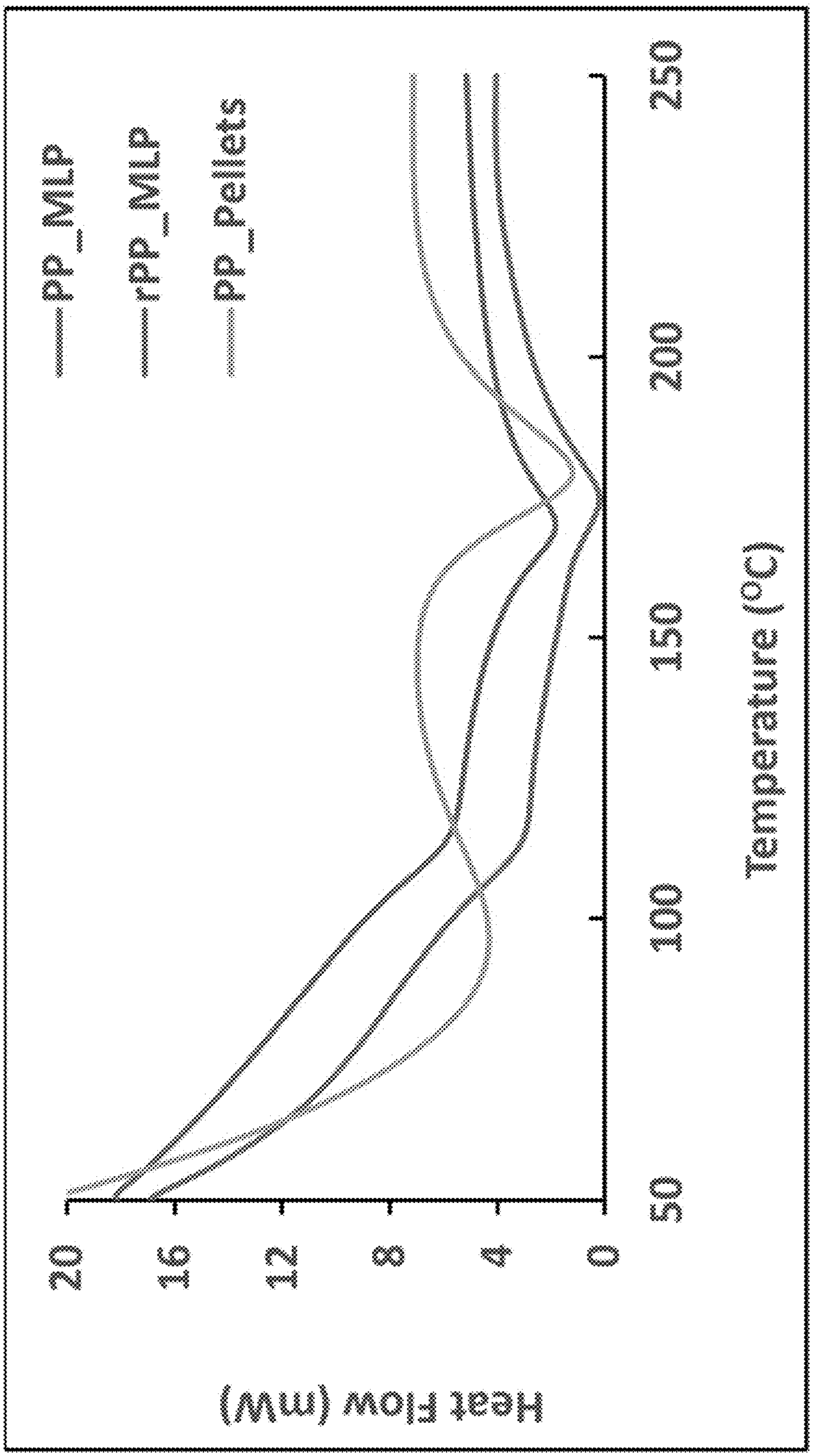
FIG. 8C: DSC profiles pristine PP, waste PP present within feedstock MLP, and recovered PP produced from the dissolution/re-precipitation method described herein.
Figure 8D:
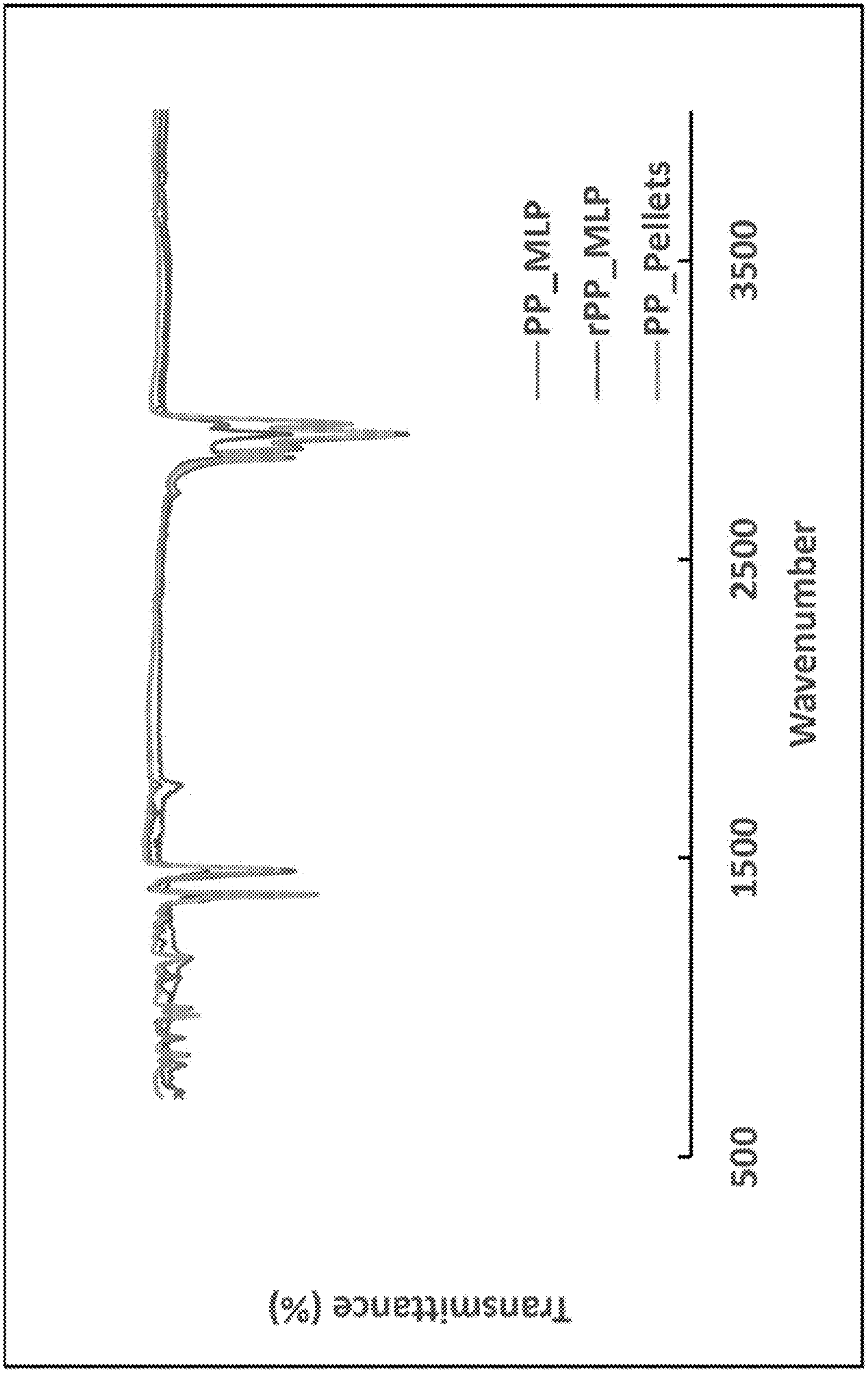
FIG. 8D: FTIR profiles pristine PP, waste PP present within feedstock MLP, and recovered PP produced from the dissolution/re-precipitation method described herein.

MLP material is composed of multiple layers of different polymers that are combined using innovative technologies in order to achieve optimal functional properties for various applications including food and medical. These MLPs are typically composed of PE, PP, PET, EVOH, paper, metal, others, and a combination thereof. The dissolution/re-precipitation method herein also has the ability to recover PP from MLP. Waste MLPs obtained from particular commercial food packaging were cut into 4×4 mm flakes and then incubated in waste cooking oil at 200 °C for 15 min to selectively dissolve PP. Oil containing PP was separated from the rest of the materials by gravity separation. Upon cooling the oil-PP solution to room temperature and addition of anti-solvent, PP re-precipitated, which was easily separated from the oil using solid-liquid operations. The mass balance of this experiment is shown in FIG. 8A, which demonstrates recovery of PP that were present in the MLP. Thermal properties of recovered PP (FIGS. 8B, 8C) from this dissolution/re-precipitation in waste oils/fats method were similar to pristine PP and also similar to waste PP present within feedstock MLP. Also, the molecular fingerprint (FTIR spectrum) of recovered PP (FIG. 8D) from this dissolution/re-precipitation in waste oils/fats method was similar to pristine PP and also similar to waste PP present within feedstock MLP. Therefore, the dissolution/re-precipitation technique using green solvents produces "virgin-like" quality of recycled PP from MLP.

Example 8

Figure 9A:
FIG. 9A: Photograph of MLP before incubation (no delamination)
Figure 9B:
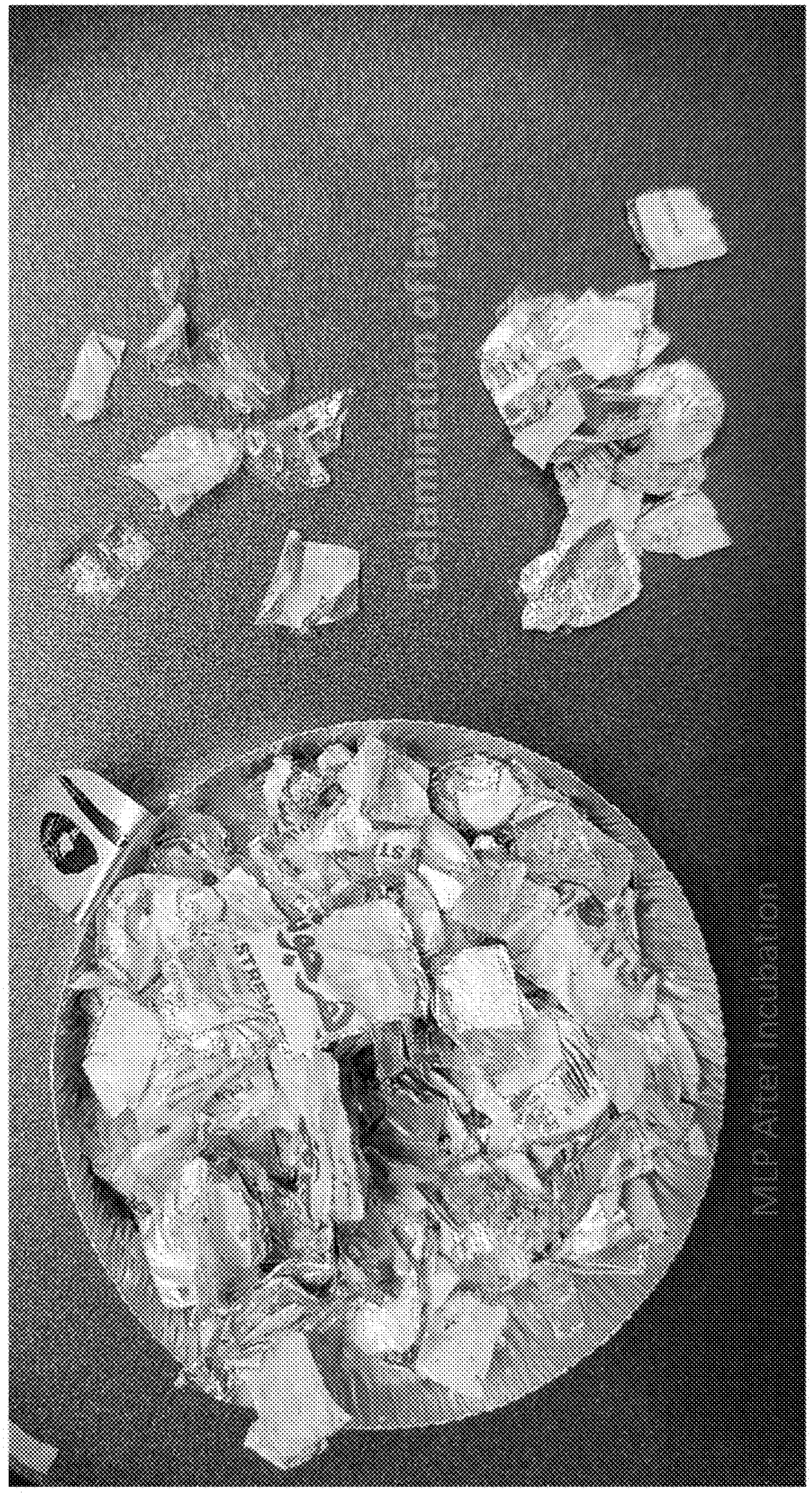
FIG. 9B: Photograph of MLP after incubation (delamination)

MLP material is composed of multiple layers of different polymers that are combined using innovative technologies in order to achieve optimal functional properties for various applications including food and medical. These MLP's are typically composed of PE, PP, PET, EVOH, paper, metal, others, and a combination thereof. The dissolution/re-precipitation method herein also has the ability to delaminate these layers. Waste MLP's obtained from some commercial food packaging were cut into 4×4 mm flakes and then incubated in waste cooking oil at 200 °C for 15 min. After incubation, the MLP material, which looked like a single layer of material, started delaminating. FIG. 9A and FIG. 9B show photographs of the MLP before (FIG. 9A) and after (FIG. 9B) incubation confirming the process of delamination.

Example 9

Figure 10A:
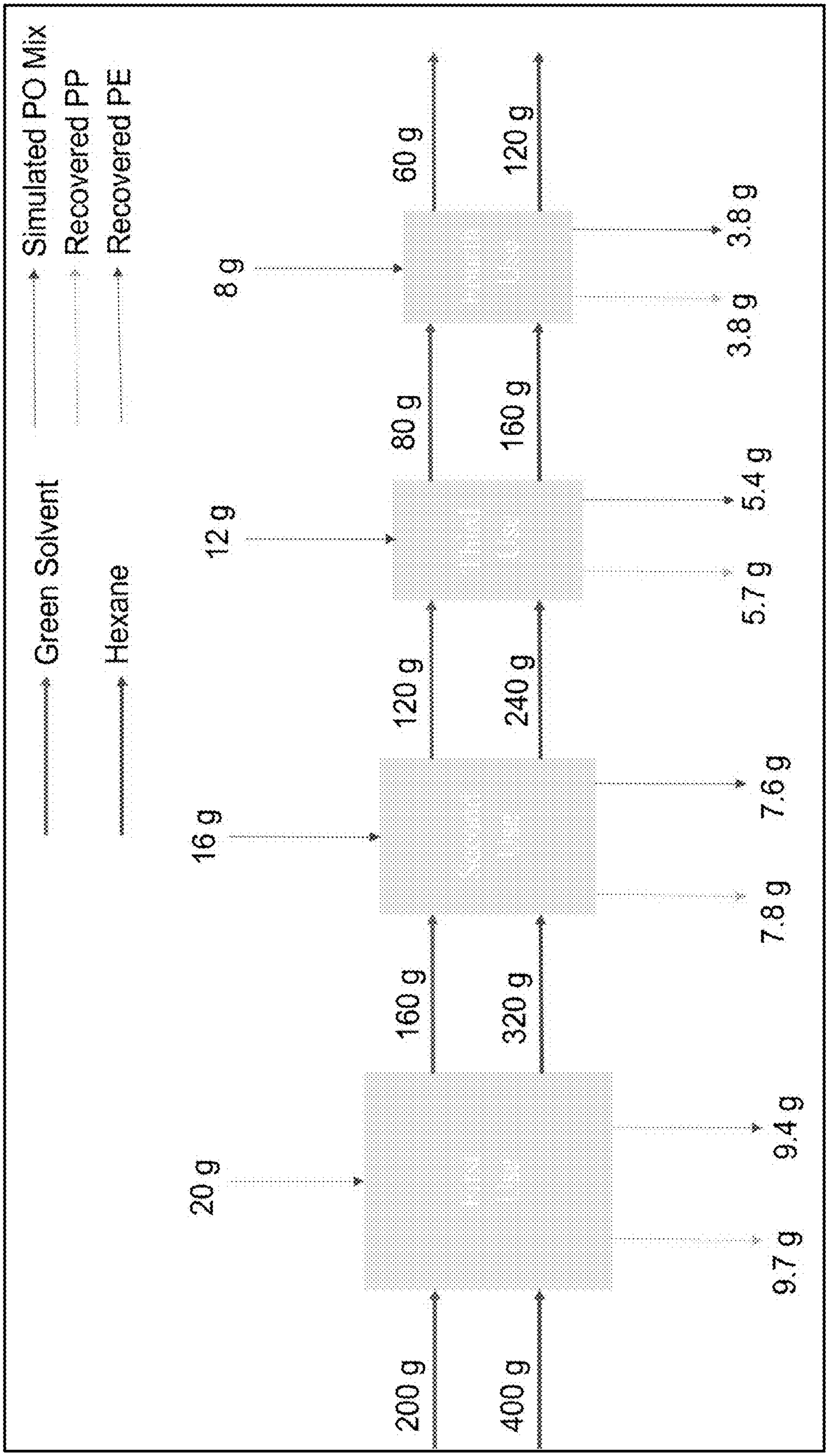
FIG. 10A: Schematic of recycling and reusing of oil and anti-solvent in the dissolution/re-precipitation method described herein.
Figure 10B:
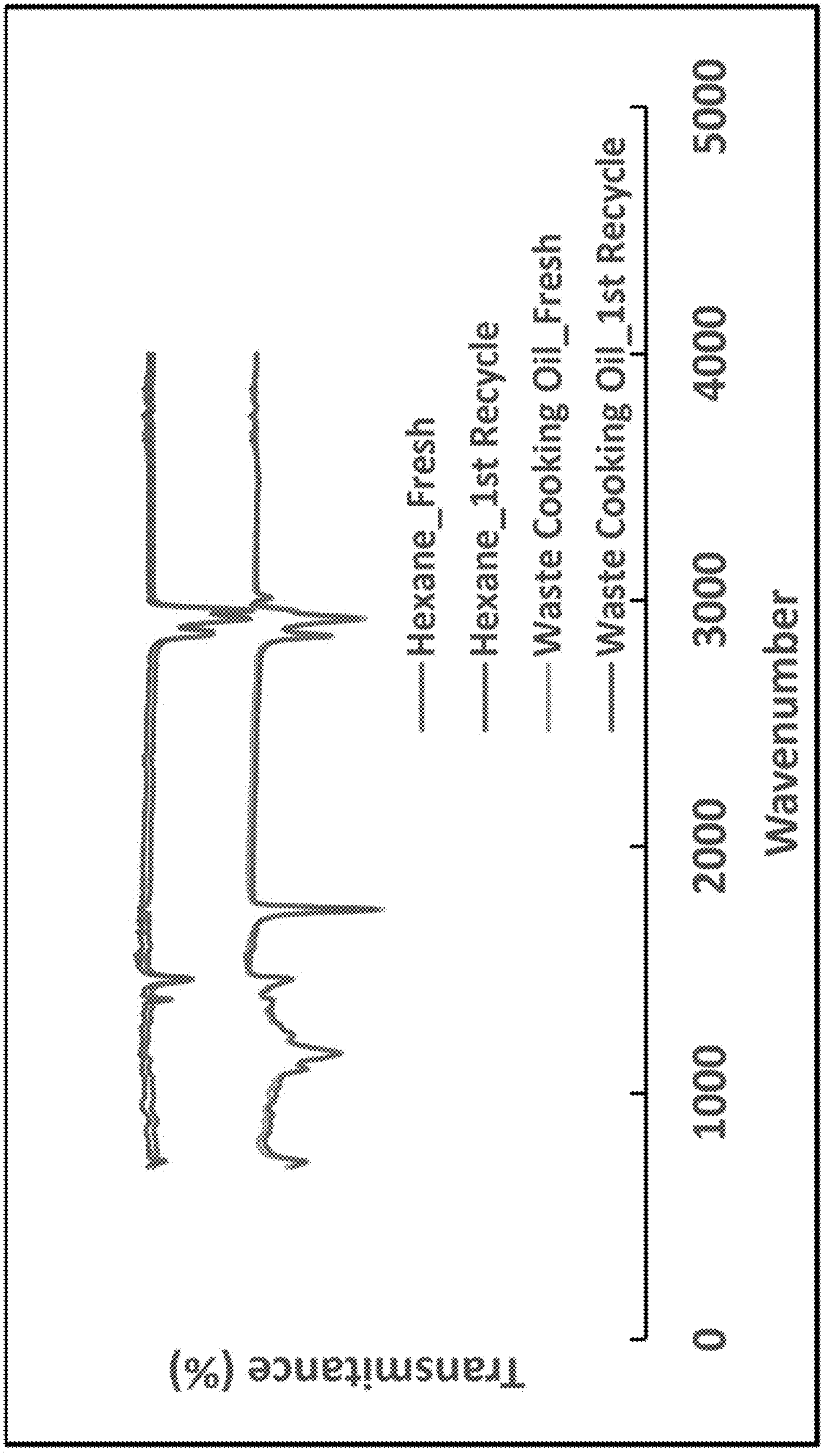
FIG. 10B: FTIR profile of waste cooking oil, waste cooking oil after 1st recycle, hexane, and hexane after 1st recycle in the dissolution/re-precipitation method described herein.

The dissolution and re-precipitation method herein uses oil for selective dissolution of PP, and an anti-solvent is added to oil containing the dissolved PP to cause re-precipitation of the PP. In this case, hexane was added to the re-precipitated, oil-infused PP and incubated at 50 °C for 1 h. This allowed removal of residual oil from the PP. Additional washes with anti-solvent can also be implemented to further remove trace quantities of oil, if desired. The separation and recycling of oil and anti-solvent was undertaken. The mixture of waste cooking oil and hexane used as anti-solvent was subjected to separation based on boiling point difference in a rotovap equipment. The rotovap was operated at 50 °C temperature and 335 mBar pressure. The separated oil and anti-solvent can be used for further dissolving PP and causing PP re-precipitation, respectively, in subsequent separation experiments. In each experiment, a simulated mixture of PP and PE was used. A total of 4 times recycling for both oil and anti-solvent was successfully demonstrated. A schematic of these recycle and reuse experiments is shown in FIG. 10A. The FTIR profile of waste cooking oil, waste cooking oil after 1st recycle, hexane, and hexane after the 1st recycle is shown in FIG. 10B, which shows that neither solvent nor anti-solvent was degraded upon use in the PP recovery process. The TGs also confirm that the oil and anti-solvent did not contain any measurable carryover PP.

Example 10

Solubility of PP in oil was measured at increasing concentrations of PP. Low concentrations of 1-2% (g PP/g oil) as well as higher concentrations of 10% to 50% (g PP/g oil) were tested. PP was completely soluble in hot oil even when concentrations were as high as 50%. However, at very high concentrations (>30%), the hot oil-PP solution became visibly more viscous. Up to a concentration of 20%, the solution viscosity was not visibly increased relative to hot oil. At all concentrations (up to 50%), PP could be re-precipitated via addition of anti-solvent.

Experimental Setup

Figure 11:
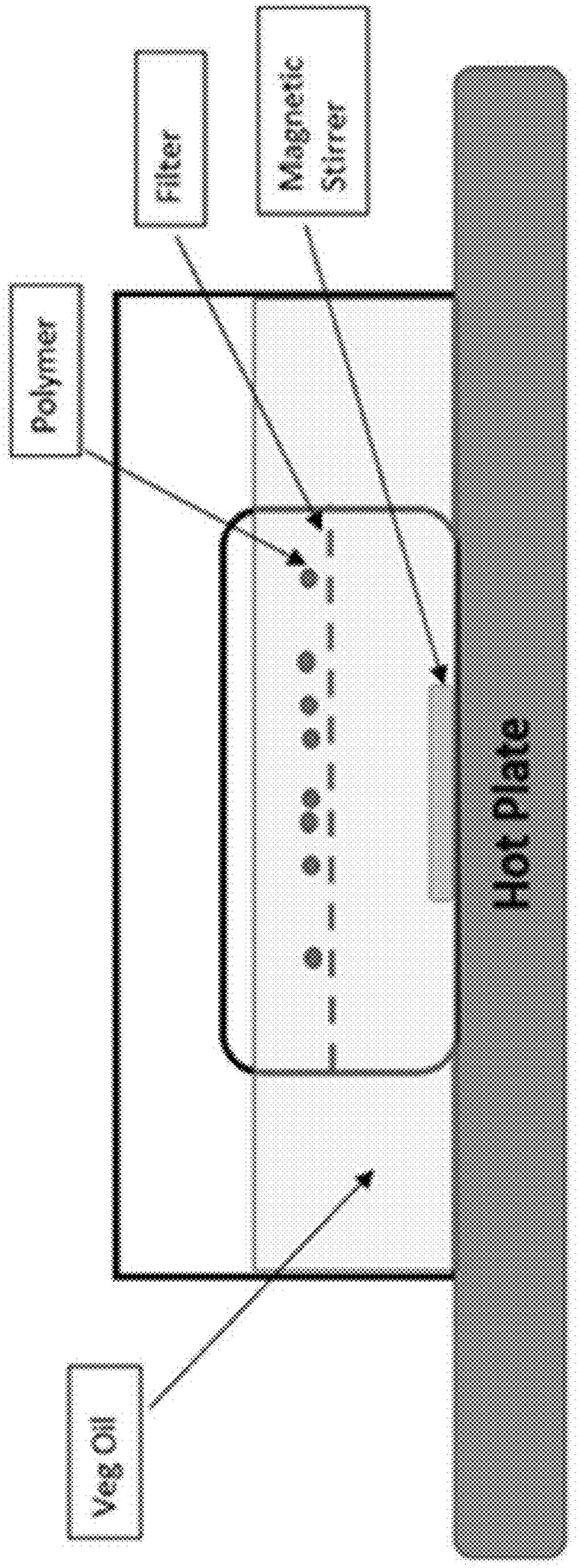
FIG. 11: Schematic illustration of the experimental setup used in the examples herein.
Figure 12:
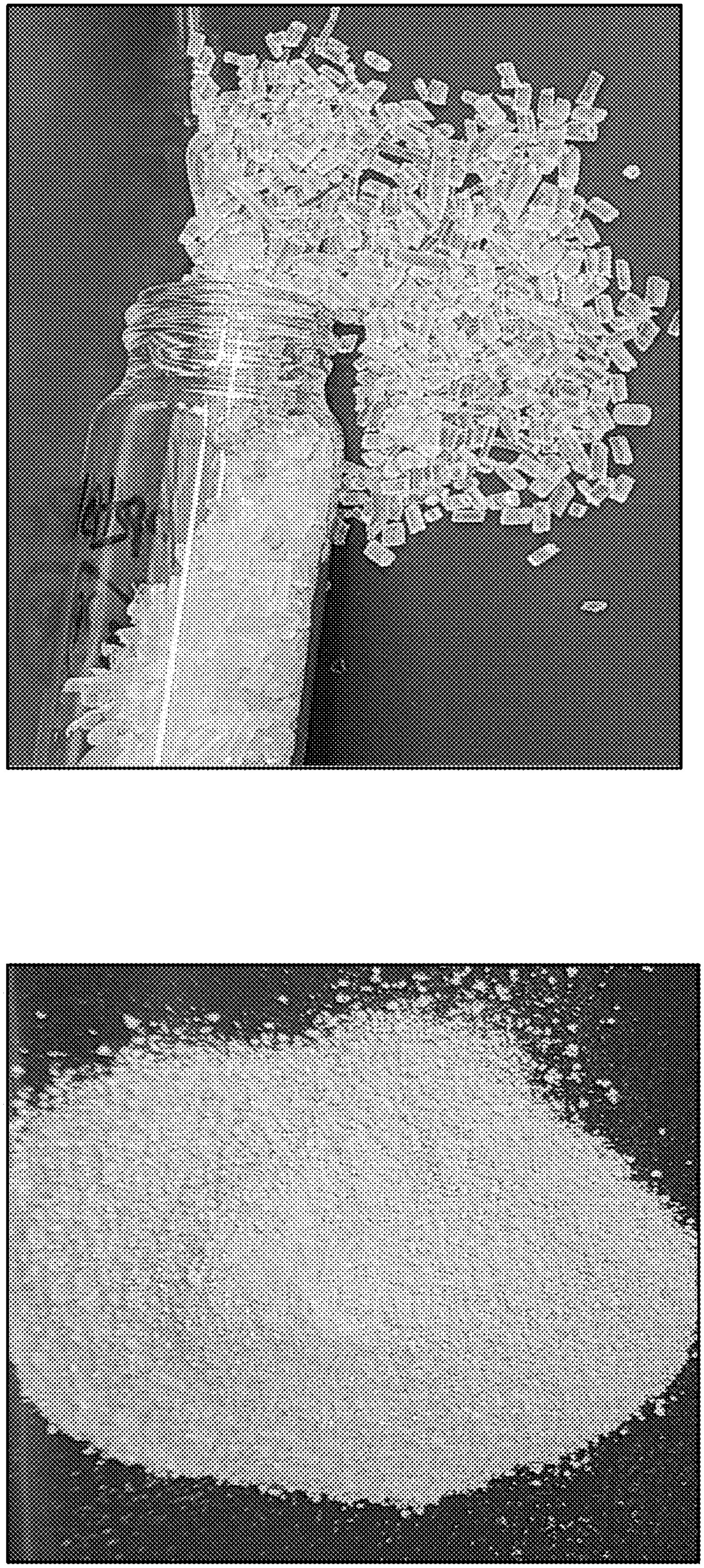
FIG. 12: Images of recovered PP powder and subsequently formed PP pellets from the dissolution/re-precipitation process.

A schematic of the experimental set-up used in Examples 1-10 is shown in FIG. 11. The setup involved a hot plate, a Pyrex glass bowl, a stainless-steel screen/filter, and a magnetic stirrer. The hot plate was the heat source to maintain oil-plastic mixtures in the temperature range of 180-230 °C. The pyrex glass bowl was placed on the hot plate while the stainless-steel screen was placed inside the glass bowl. A magnetic stirrer was placed below the sieve to create a vortex and ensure adequate mixing. 100-140 g of oil was used in these experiments so that the stainless-steel screen was submerged in oil. Used cooking oil was first preheated to 180-230 °C and then the polyolefin mixture was added to a stainless-steel screen that was lowered into the hot oil. Within 15 min, complete dissolution of PP in used cooking oil was observed while PE settled on the stainless-steel screen. PE was recovered by simply removing the stainless-steel screen from the submerged used cooking oil. PP was precipitated by cooling the oil-PP mix to room temperature and addition of anti-solvent. Recovered PE as well as PP was stored for further TG/DSC analysis, compositional analysis, and product development.

Certain embodiments of the compositions and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method of separating polypropylene (PP) from mixed plastic waste, the method comprising:

adding mixed plastic waste to an oil maintained at a temperature ranging from about 180 °C to about 230 °C for a time sufficient to dissolve PP from the mixed plastic waste in the oil, thereby forming an oil-PP solution, wherein the oil comprises a triglyceride;

separating the oil-PP solution from the mixed plastic waste using a solid-liquid separation technique; and allowing the oil-PP solution to cool, thereby forming an oil-PP mixture, to recover the PP.

2. The method of claim 1, wherein a concentration of PP in the oil-PP solution is less than about 2 wt %, and the cooling results in formation of a distinct solid phase of oil-infused PP.

3. The method of claim 1, wherein a concentration of PP in the oil-PP solution is greater than about 2 wt %, and the cooling results in formation of a homogeneous gel-like or wax-like solid phase containing oil and PP.

4. The method of claim 1, wherein the temperature is about 200 °C.

5. The method of claim 1, wherein the mixed plastic waste comprises polyethylene terephthalate (PET), PE, PP, polyvinyl chloride (PVC), polystyrene, and nylon.

6. The method of claim 1, wherein the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof.

7. The method of claim 1, comprising adding an anti-solvent to the oil-PP mixture to aid re-precipitation of the PP and facilitate removal of oil.

8. The method of claim 7, further comprising separating the re-precipitated PP from the oil and the anti-solvent.

9. The method of claim 8, further comprising separating the oil from the anti-solvent.

10. The method of claim 7, wherein the anti-solvent is hexane, ethanol, propanol, butanol, isopropyl alcohol, other linear or branched alcohol, other organic solvent with a high affinity for oil, or a mixture thereof.

11. The method of claim 7, wherein the anti-solvent is incubated with the oil-PP mixture at a second temperature ranging from room temperature to about 70 °C for a time of from 2 minutes to 2 hours.

12. The method of claim 1, wherein the mixed plastic waste is a polyolefin mixture containing PE and PP, the mixed plastic waste being obtained by separating polyolefins from mixed plastics using a sink-floatation method to recover the polyolefin mixture.

13. The method of claim 1, wherein the time ranges from about 2 minutes to about 60 minutes.

14. A method for removing pigments, adhesives, and food residues from plastic waste, the method comprising incubating a plastics mixture in an acid solution at an elevated temperature for a first time sufficient to dissolve pigments or adhesives and to dislodge or hydrolyze food residues adhered to plastic surfaces in the plastics mixture while keeping polymer structures in the plastics mixture intact.

15. The method of claim 14, wherein the elevated temperature is about 90 °C.

16. The method of claim 14, wherein the first time is about 90 minutes.

17. The method of claim 14, wherein the plastics mixture comprises PET, PE, PP, PVC, polystyrene, and nylon.

18. The method of claim 14, wherein the acid is a mineral acid, an organic acid, or a combination thereof.

19. A recycled material comprising:

one of polypropylene (PP) or polyethylene (PE); and an oil in an amount of less than 2% by weight, wherein the oil comprises a triglyceride;

wherein the oil is attached to surfaces or void spaces of the PP or PE.

20. The recycled material of claim 19, wherein the oil comprises soybean oil, rapeseed oil, canola oil, sunflower oil, safflower oil, peanut oil, cottonseed oil, coconut oil, palm oil, olive oil, avocado oil, flaxseed oil, sesame oil, hemp seed oil, corn oil, yellow grease, waste cooking oil, brown grease, algae oil, or a combination thereof.

* * * * *